(12) United States Patent
Brockman et al.

(10) Patent No.: US 7,136,467 B2
(45) Date of Patent: Nov. 14, 2006

(54) CUSTOMER-ORIENTED TELECOMMUNICATIONS DATA AGGREGATION AND ANALYSIS METHOD AND OBJECT ORIENTED SYSTEM

(75) Inventors: Stephen J. Brockman, Noblesville, IN (US); Michael G. Ludlow, Noblesville, IN (US)

(73) Assignee: Symphony Service Corp, Palo Alto, CA (US)

( * ) Notice: Subject to any disclaimer, the term of this patent is extended or adjusted under 35 U.S.C. 154(b) by 172 days.

(21) Appl. No.: 10/035,844

(22) Filed: Jan. 4, 2002

(65) Prior Publication Data

US 2002/0123919 A1 Sep. 5, 2002

(51) Int. Cl.
*H04M 15/00* (2006.01)
(52) U.S. Cl. .............................. 379/112.06; 379/112.07
(58) Field of Classification Search ........... 379/112.06, 379/112.07
See application file for complete search history.

(56) References Cited

U.S. PATENT DOCUMENTS

| | | | |
|---|---|---|---|
| 5,287,270 A | 2/1994 | Hardy et al. | |
| 5,771,282 A | 6/1998 | Friedes | |
| 5,784,443 A | 7/1998 | Chapman et al. | |
| 5,793,853 A | 8/1998 | Sbisa | |
| 5,799,073 A * | 8/1998 | Fleischer, III et al. .. | 379/112.01 |
| 5,835,580 A | 11/1998 | Fraser | |
| 5,875,238 A | 2/1999 | Glitho et al. | |
| 5,884,284 A | 3/1999 | Peters et al. | |
| 5,905,715 A | 5/1999 | Azarmi et al. | |
| 5,912,954 A | 6/1999 | Whited et al. | |
| 5,915,006 A | 6/1999 | Jagadish et al. | |
| 5,978,780 A | 11/1999 | Watson | |
| 6,032,132 A | 2/2000 | Nelson | |
| 6,047,051 A | 4/2000 | Ginzboorg et al. | |
| 6,072,493 A * | 6/2000 | Driskell et al. ............. | 715/854 |
| 6,128,602 A | 10/2000 | Northington et al. | |
| 6,240,091 B1 | 5/2001 | Ginzboorg et al. | |
| 6,266,401 B1 | 7/2001 | Marchbanks et al. | |
| 6,282,274 B1 | 8/2001 | Jain et al. | |
| 6,304,857 B1 | 10/2001 | Heindel et al. | |
| 6,721,405 B1 * | 4/2004 | Nolting et al. ............... | 379/133 |
| 6,968,320 B1 * | 11/2005 | Kam et al. .................... | 705/40 |
| 7,076,036 B1 * | 7/2006 | Johnson ................. | 379/112.06 |

OTHER PUBLICATIONS

Kang et al., "Telecommunications Billing Interfaces," 1998 IEEE Network Operations and Managament Symposium, vol. 2, pp. 701-704 (1998).
Bleakley et al., "TMN Specifications to Support Inter-Domain Exchange of Accounting, Billing and Charging Information," Intelligence in Services and Networks: Technology for Cooperative Competition, pp. 275-282 (1997).
Baltazis et al., "Advanced Software Systems for Usage Based Charging in Broadband Multi-Service Networks," Systems for Usage Based Charging in Broadband Multi-Service Networks, pp. 632-641.

(Continued)

*Primary Examiner*—Barry Taylor
(74) *Attorney, Agent, or Firm*—Paul Davis; Heller Ehrman LLP

(57) ABSTRACT

The present invention involves obtaining telecommunications data of a business entity from its communications vendors and providing that business entity with aggregated telecommunications data. After obtaining from multiple vendors both the detailed information of a business entity's telecommunications assets and usage of network services and/or the accompanying costs for those assets and services, the present invention aggregates the detailed information for telecommunications asset management and analysis purposes and provides the business entity with the aggregated information, for example by database or through a network interface.

91 Claims, 10 Drawing Sheets

FIG. 1

OTHER PUBLICATIONS

Wilson, John, "Configuring an Optimized Convergence Network Billing System," 1998 IEEE Network Operations and Management Symposium, vol. 1, pp. 130-147 (1998).

Val Niblock, "Vision 2000 Business Capability for Extraordinary Customer Care," 1998 IEEE Network Operations and Management Symposium, vol. 1, pp. 149-158 (1998).

Ingo Busse, "Accounting Management for Global Broadband Connectivity Services," 1998 IEEE Network Operations and Management Symposium, vol. 1, pp. 159-168 (1998).

Patrick Hellemans et al., "Accounting Management in a TINA-Based Service and Network Environment," Intelligence in Services and Networks Paving the Way for an Open Service Market, pp. 13-24.

Nishiki et al., "Integrated Management Architecture based on CORBA," 2000 IEEE/IFP Network Operations and Management Symposium "The Networked Planet: Management Beyond 2000", Session One, pp. 3-15 (2000).

Nakamura et al., "A Pricing and Accounting Architecture for QOS Guaranteed Services on a Multi-Domain Network", Symposium on Global Internet: Application and Technology Symposium on Enterprise Applications and Services, vol. 3, pp. 1984-1988.

Acuna et al., "ATM Services Usage Metering for Accounting and Charging," Intelligence in Services and Networks: Technology for Ubiquitous Telecom Services, pp. 61-72 (1998).

Joel Fleck, "A Distrubuted Near Real-Time Billing Environment," IEEE, pp. 142-148 (1998).

* cited by examiner

CUSTOMER-ORIENTED TELECOMMUNICATIONS DATA AGGREGATION AND ANALYSIS METHOD AND OBJECT ORIENTED SYSTEM

BACKGROUND OF THE INVENTION

1. Field of the Invention

The invention relates to telecommunications data. More specifically, the field of the invention is that of comparative evaluation of telecommunications data.

2. Description of the Related Art

There are many challenges associated with the successful operation of businesses. One of these challenges includes the efficient utilization of the businesses resources. Competition in one form or another forces business owners to constantly evaluate their business resources and determine whether or not they are being efficiently utilized. There are many historical breakthroughs in business resource utilization that have dramatically affected commerce and changed the way business is done.

For example, in the early stages of the automobile industry automobiles were so costly that they could only be purchased by people having substantial incomes. In these early stages, the primary cost of manufacturing was the labor cost. Automobiles were made one at a time. Workmen would either be responsible for a number of different tasks or they would be called upon to perform a specific task at a specific time. In either of these cases the labor resource was not being completely utilized. In the first instance, workmen who were responsible for a number of different tasks typically were not as efficient as they could be at all of the them. In the later instance, workmen were being paid to move between jobs, a cost that was never recovered.

Henry Ford changed all this when he invented a better way to manufacture automobiles—the assembly line. With the assembly line in place automobiles could be manufactured more efficiently by cutting labor costs. Employees were able to work efficiently at a certain position, do one job, do it well, and do it many times over to produce automobiles that were able to be afforded by people of almost every income bracket. Ford recognized the benefit of complete resource utilization. Basically Ford got more bang for his buck. For every hour he paid a workman on the assembly line, the workman was being utilized. Prior to Ford's assembly line, the workman may have been paid to perform a job inadequately or to wastefully move in between jobs.

To this day, labor and materials are still important resources; however, other resources are playing an even more important role in modem business. In order to effectively compete, modem businesses must rely on telecommunications. Whether companies are making themselves more accessible by providing associates with pagers and cell phones or they are conducting business or advertising over the internet, the costs of providing these services are telecommunication resources. At one point in business the telecommunications cost was the fourteenth or fifteenth highest cost of doing business. In recent years this cost has been ranked as high as third or fourth.

To date no one has completely effectively utilized these telecommunications resources. Typically the extent to which these resources are managed consists of shopping for the lowest rate plan possible. Returning to the early automobile industry for a moment, this is the equivalent of hiring workmen who would work for the least amount of compensation. Clearly this technique does not address the utilization of the resource. What is needed is a method or system that allows businesses to determine the utilization of their telecommunication resource. Only when the utilization is determined can companies alter their present utilization to more effectively utilize their telecommunications resource.

Conventional telecommunications rating and analysis is performed by the telecommunications services provider, or by a third party vendor using data from the telecommunications services provider's billing data. These conventional telecommunications rating analysis vendors attempt to provide business entities a way to analyze telecommunications billing data in an organized and timely manner, but fail to provide a comprehensive business entity cost and usage analysis. What is needed is a better telecommunication data analysis system.

SUMMARY OF THE INVENTION

The present invention involves obtaining telecommunications data of a business entity from its telecommunications vendors and providing access to that business entity for aggregated and uniform telecommunications detail data. After obtaining from multiple vendors both the detailed information of a business entity's telecommunications usage of network services and/or the accompanying costs for those services, the present invention aggregates the detailed information into a uniform structure to allow the business entity to manage its telecommunications assets and analyze the aggregated detail information.

In this way, the present invention allows a business entity to establish greater control over the utilization of its telecommunications environment by reviewing its services from multiple vendors in multiple locations. This creation of a business entity's multiple vendor information into a uniform database allows the business entity to analyze its telecommunications services at the entity level, effectively plan for future needs and standardize its services. The present invention can also be used to fulfill the following objectives: forecast required service applications with a focus on particular locations, implement service optimizations, and determine the feasibility of telecommunications strategic initiatives.

In the present invention, a method and system provides for analyzing a business entity's telecommunications usage and/or cost data according to the business entity's selected aggregation criteria, for example usage aggregation criteria. In one form, the usage aggregation criteria may include location usage data, such as site data and region data. In another form, usage aggregation criteria may include service usage data, such as service provider data, service type data and component data. In still another form, usage aggregation criteria may include time usage data, such as time of month data and length of call data. Another usage aggregation criteria may include user-defined usage data, where a business entity utilizing the present invention creates the parameter(s) which define the user-defined usage data.

The present invention may also use business entity cost aggregation criteria. In one form, the cost aggregation criteria may include location cost data, such as site data and region data. In another form, the cost aggregation criteria may include service cost data, such as service provider data, service type data, component data and industry data. In another form of the present invention, the cost aggregation criteria may include time cost data, such as time of month or time of day data. In another form, the cost aggregation criteria may include user-defined cost data where a business entity utilizing the present invention creates the parameter(s) which define the user-defined cost data.

The method and system of the invention provides for the translation of the telecommunications usage and/or cost data from the non-standard formats of the telecommunications providers to a uniform database format. In addition, the detailed information from several providers may be combined in a queriable fashion to allow for entity level evaluation of such usage and/or cost. This translation may be done on a server housed by the telecommunications providers and/or by a separate entity.

The method and system of the invention further provides for separately aggregating the telecommunications usage and/or cost data obtained from the telecommunications providers according to the business entity aggregation criteria. The business entity aggregation criteria may be aggregated by consolidating the data, by counting the data, by totaling the data, or by averaging the data. In another form, the telecommunications usage and/or cost data are aggregated by calculating percentages based on the data. In yet another form, the telecommunications usage and/or cost data are aggregated by calculating standard deviations of the data. The aggregated telecommunications usage and/or cost data is stored into a database relating to the business entity.

The method and system of the invention provides the business entity with the aggregated telecommunications usage and/or cost data by being made accessible to the business entity by a telecommunications management service provider ("telco management service") over a network, or alternatively by the telco management service providing a network portal which allows the business entity to query the database in which the aggregated usage and/or cost data is stored. The system of the present invention carries out the query by requesting the aggregated telecommunications usage and/or cost data from the database, retrieving the aggregated telecommunications usage and/or cost data from the database, and returning the aggregated telecommunications usage and/or cost data from the database in the form of a query result. The query result is then presented to the business entity. In another form, the aggregated telecommunications usage and/or cost data may not be made accessible to the business entity by the telco management service. In this way, the telco management service queries the database in which the aggregated usage and/or cost data are stored. Once the query result is presented to the telco management service, the telco management service delivers the result over a network to the business entity. Further, the provision of the aggregated telecommunications usage and/or cost data may be automated, such as by automatic e-mail messages or other "push" type technology.

The present invention may further have performance data associated with the aggregated telecommunications usage and/or cost data for analysis purposes. Performance data takes many different forms, such as sales success data, sales volume data, and sales type data, bonus sales made data and sales leads generation data. The performance data may be combined with the aggregated telecommunications usage and/or cost data and stored in a database. As such, the present invention provides a method and system that allows combinations of performance data, aggregated telecommunications usage data, and/or aggregated telecommunications cost data which may be queried in the manner described above. The performance data may alternatively be stored in a separate file that may be cross-referenced. In this instance, the system of the present invention requests the performance data from the file, retrieves the performance data from the file, and returns the performance data from the file in the form of a search result. The search result is then presented to an end user.

The aggregated telecommunications usage and/or cost data may be further calculated to generate metric data. Metric data is data generated by analyzing aggregated telecommunications usage and/or cost data, such as by averaging the aggregated telecommunications usage and/or cost data according to other information, thus generating metric data. Metric usage data may be defined by parameters such as the average telecommunications usage data per full time equivalent "FTE," the average telecommunications usage data per telephone line, the average telecommunications usage data per sale, and the average telecommunications usage data per production unit. Metric cost data may be defined by parameters such as the average telecommunications cost data per FTE, the average telecommunications cost data per telephone line, the average telecommunications cost data per sale, and the average telecommunications cost data per production unit. The present invention may accommodate other parameters to define other types of metric data.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein.

Figure 1:
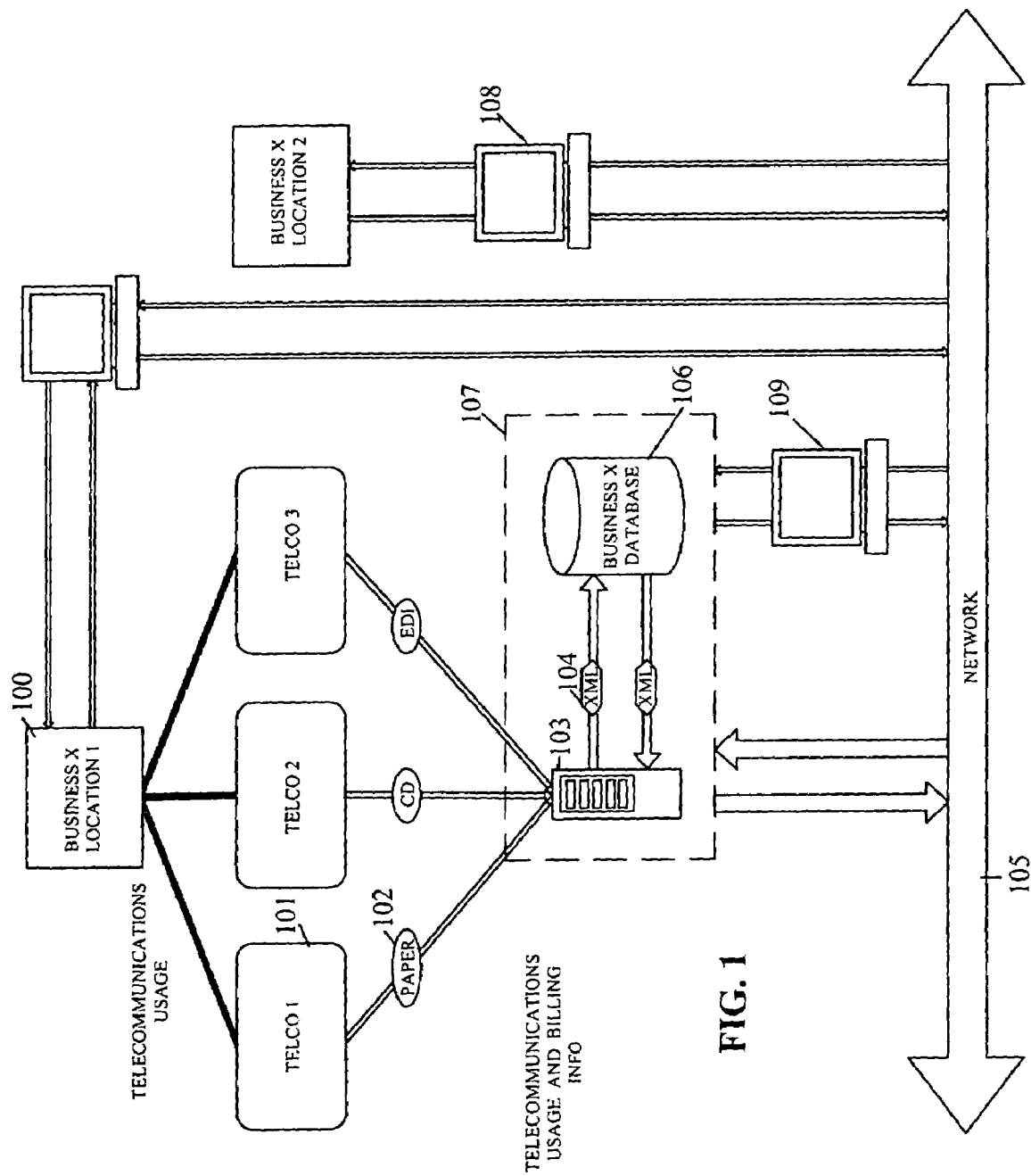
FIG. 1 is a schematic flow chart diagram of the data flow of the present invention.

Although the drawings illustrate both the embodiments of the present invention and those of a telecommunications usage analysis system in which the present invention might be implemented, the drawings are not necessarily to scale and certain features may be exaggerated in order to better illustrate and explain the present invention. The exemplification set out herein illustrate embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description. Rather, the embodiments are chosen and described so that others skilled in the art may utilize their teachings.

The detailed descriptions which follow are presented in part in terms of algorithms and symbolic representations of operations on data bits within a computer memory representing alphanumeric characters or other information. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, symbols, characters, display data, terms, numbers, or the like. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart a physical organization on the information stored in memory. More than mere abstraction, the data structures are specific electrical or magnetic structural elements in memory which simultaneously represent complex data accurately and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. The present invention relates to a method and apparatus for operating a computer in processing electrical or other (e.g., mechanical, chemical) physical signals to generate other desired physical signals.

The present invention also relates to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

The present invention deals with "object-oriented" software, and particularly with an "object-oriented" operating system. The "object-oriented" software is organized into "objects", each comprising a block of computer instructions describing various procedures ("methods") to be performed in response to "messages" sent to the object or "events" which occur with the object. Such operations include, for example, the manipulation of variables, the activation of an object by an external event, and the transmission of one or more messages to other objects.

Messages are sent and received between objects having certain functions and knowledge to carry out processes. Messages are generated in response to user instructions, for example, by a user activating an icon with a "mouse" pointer generating an event. Also, messages may be generated by an object in response to the receipt of a message. When one of the objects receives a message, the object carries out an operation (a message procedure) corresponding to the message and, if necessary, returns a result of the operation. Each object has a region where internal states (instance variables) of the object itself are stored and where the other objects are not allowed to access. One feature of the object-oriented system is inheritance. For example, an object for drawing a "circle" on a display may inherit functions and knowledge from another object for drawing a "shape" on a display.

A programmer "programs" in an object-oriented programming language by writing individual blocks of code each of which creates an object by defining its methods. A collection of such objects adapted to communicate with one another by means of messages comprises an object-oriented program. Object-oriented computer programming facilitates the modeling of interactive systems in that each component of the system can be modeled with an object, the behavior of each component being simulated by the methods of its corresponding object, and the interactions between components being simulated by messages transmitted between objects.

An operator may stimulate a collection of interrelated objects comprising an object-oriented program by sending a message to one of the objects. The receipt of the message may cause the object to respond by carrying out predetermined functions which may include sending additional messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object-oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object-oriented programming makes simulation of systems of interrelated components more intuitive, the operation of an object-oriented program is often difficult to understand because the sequence of operations carried out by an object-oriented program is usually not immediately apparent from a software listing as in the case for sequentially organized programs. Nor is it easy to determine how an object-oriented program works through observation of the readily apparent manifestations of its operation. Most of the operations carried out by a computer in response to a program are "invisible" to an observer since only a relatively few steps in a program typically produce an observable computer output.

In the following description, several terms which are used frequently have specialized meanings in the present context. The term "object" relates to a set of computer instructions and associated data which can be activated directly or indirectly by the user. The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations", provide a user interface so that users of computer networks can access the network resources, such as shared data files, common peripheral devices, and inter-workstation communication. Users activate computer programs or network resources to create "processes" which include both the general operation of the computer program along with specific operating characteristics determined by input variables and its environment. The term "network" also relates to a communications network, i.e., a medium that allows communications data to flow between multiple, connected systems. For instance, one type of communications network may be a globally accessible information interchange includes the internet. In this type of global network, millions of computer systems are connected and data is transmitted over the network between multiple computer systems.

Another type of communications network may be a cellular network. A cellular network connects multiple cellular systems, and data is transmitted between systems by a combination of radio transmissions and conventional telephone switching to permit telephone communication to and from mobile users within a specified area. One type of cellular system is the Global System for Mobile Communications ("GSM"). GSM uses narrowband TDMA (short for Time Division Multiple Access), a technology for delivering digital wireless service using time-division multiplexing. TDMA works by dividing a radio frequency into time slots and then allocating slots to multiple calls. In this way, a single frequency can support multiple, simultaneous data channels. Another type of cellular system is Code-Division Multiple Access ("CDMA"), a digital cellular technology that uses spread-spectrum techniques. CDMA does not assign a specific frequency to each user. Instead, every channel uses the full available spectrum. Individual conversations are encoded with a pseudo-random digital sequence.

Another type of communications network may be a wireless network. A wireless network connects multiple wireless systems and transmits data between the systems data over radio waves.

The terms "desktop", "personal desktop facility", and "PDF" mean a specific user interface which presents a menu or display of objects with associated settings for the user associated with the desktop, personal desktop facility, or PDF. When the PDF accesses a network resource, which typically requires an application program to execute on the remote server, the PDF calls an Application Program Interface, or "API", to allow the user to provide commands to the network resource and observe any output. The term "Browser" refers to a program which is not necessarily apparent to the user, but which is responsible for transmitting messages between the PDF and the network server and for displaying and interacting with the network user. Browsers are designed to utilize a communications protocol for transmission of text and graphic information over a world wide network of computers, namely the "World Wide Web" or simply the "Web." Examples of Browsers compatible with the present invention include the Navigator program sold by Netscape Corporation and the Internet Explorer sold by Microsoft Corporation (Navigator and Internet Explorer are trademarks of their respective owners). Although the following description details such operations in terms of a graphic user interface of a Browser, the present invention may be practiced with text based interfaces, or even with voice or visually activated interfaces, that have many of the functions of a graphic based Browser.

Browsers display information which is formatted in a Standard Generalized Markup Language ("SGML") or a HyperText Markup Language ("HTML"), both being scripting languages which embed non-visual codes in a text document through the use of special ASCII text codes. Files in these formats may be easily transmitted across computer networks, including global information networks like the Internet, and allow the Browsers to display text, images, and play audio and video recordings. The Web utilizes these data file formats to conjunction with its communication protocol to transmit such information between servers and workstations. Browsers may also be programmed to display information provided in an eXtensible Markup Language ("XML") file, with XML files being capable of use with several Document Type Definitions ("DTD") and thus more general in nature than SGML or HTML. The XML file may be analogized to an object, as the data and the stylesheet formatting are separately contained (formatting may be thought of as methods of displaying information, thus an XML file has data and an associated method).

The present invention analyzes a business entity's telecommunications usage and/or cost data by first obtaining the telecommunications data from multiple telecommunications providers and then aggregating the usage and/or cost data for analysis purposes. In order to better understand the present invention, the following describes embodiments of a system that generally analyzes telecommunications usage data in which the present invention may be implemented.

Figure 2:
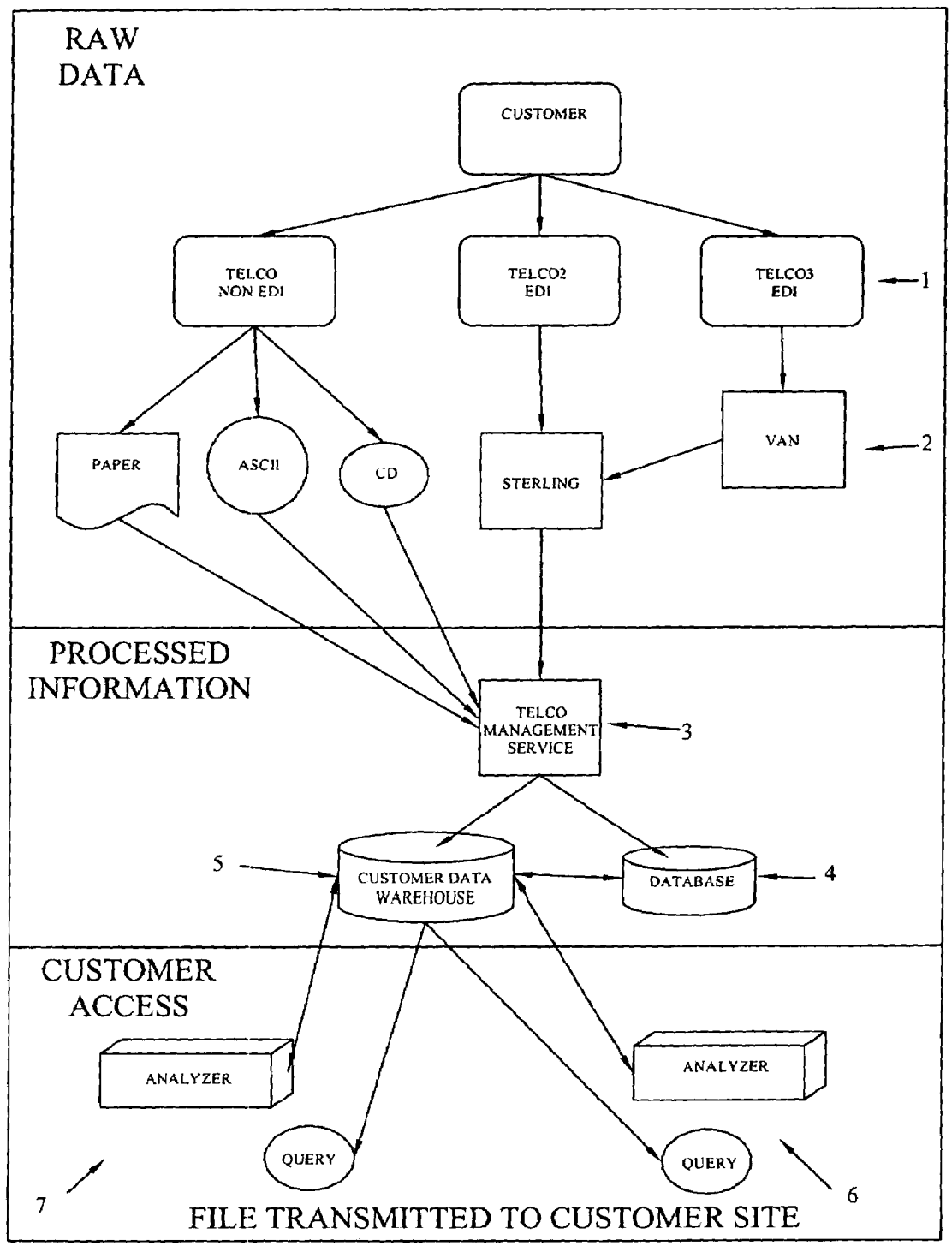
FIG. 2 is a hierarchical flow chart diagram of the data flow of the present invention.

FIG. 2 shows the hierarchical data flow of a computer system used by a telco management service that provides telecommunications usage analyses to business entities. At least two of the telecommunications providers 1, Telco1, Telco2, and Telco3, provide telecommunications data in distinct formats 2, such as on electronic transmissions or magnetic or optical media having flat files, character delimited, data blocks, etc.; or on paper. In this case the customer or the business entity also has business data stored in customer warehouse 5, which may also be in one of several formats as disclosed below.

A computer system used by a telco management service to provide business entities with a telecommunications usage analysis comprises software that translates the telecommunications data from the format of the telecommunications provider to a predefined format. As shown in FIG. 2, these telecommunications provider formats 2 may include, but are not limited to, paper, ASCII, CD-ROM, or a Sterling or Van formatted database, HTML, or other known formats. The translating software also stores telecommunications data in another, predefined format upon translation, the storage being done as depicted in FIG. 2 at telco management service 3. The translation of the data into a predefined format may include the use of an XML based format, allowing for standard database search, access, and query functions and additionally having the property of being easily transferred over a computer network, e.g., a TCP/IP or ATM protocol network. For the sole purpose of searching, accessing, and querying, another predetermined format may be used that does not have the same ease of network transfer, such as a MicroSoft Access (MicroSoft and MicroSoft Access are trademarks of MicroSoft Corporation) database format or other commercially available format.

There are number of parameters that define the telecommunication usage data that is translated. These parameters include the duration of calls, the time of day the calls were made, the call type, the origination of the call, the termination of the call, the volume or number of calls, the geography specific to the call, the day the call was made, the day of the week or month it was made, the seasonality of the calls, the deviations and variances of the calls, the service type offered, the vendor of the calls, any type of provided vendor analysis data, any aggregate information and problem resolution by the vendor are just a few of the examples of the telecommunication service provider data that is acquired according to the computer system used by a telco management service to provide business entities with a telecommunications usage analysis.

The business resource data can take many forms, including without limitation, accounting systems, enterprise resource planning (ERP) systems, and other business systems. A few of these forms of business resource data are as follows: the budgeted telecommunications cost or usage, the telecommunication seller's per full time employee (FTE), the installation on (this refers to installation time and the duration of the installation date or time of installation), and the duration or length that installation takes. Further business resource data includes telecommunications orders, repair tickets, inquiries, service levels, and credits, and also information segregated or sorted by a region, organization, or department. This list is not meant to be exhaustive, and other business related data may be used to practice the teachings of the invention, including a computer system used by a telco management service to provide business entities with telecommunications usage analysis.

In another embodiment of a telecommunications usage analysis system, the telecommunications usage data may be duration data. This duration data may be correlated with a business plan objective to call duration data by the user of the present invention. For example, certain companies may budget that salespeople should spend a predetermined amount of time on the phone calling on potential clients. The usage data in the form of call duration data may be correlated with the business plan's objectives of length of contact with potential customers data to determine whether in fact that planned calling time is being achieved. Upon correlating these two pieces of data, the business owner or customer may determine whether in fact the salespeople are meeting their budget goals. The same duration data may be correlated with sales information, then aggregated to show which call length leads to the highest level of sales, which then can be used to determine target call lengths for the next business plan.

In another embodiment of a telecommunications usage analysis system, database 4 and customer data warehouse 5 store the following data: the locations or sites of the customer's telecommunication services, all the services (local, long distance, wireless, etc.) by site; provider (vendor) of each service; account used for billing each service; devices (Automatic Number Identifications ["ANIs"], cell phones, pagers, circuits, Private Branch Exchanges ["PBXs"], etc.) for each service; work orders for moves, adds and changes ("MACs") for each accounts/service; all circuits (including routing); and client defined categories for sites, services, accounts, and/or network assets.

While the customer may conventionally receive telecommunication data in the form of CSR's, bills, and MACs, such data may be conventionally transferred to an electronic form. The invention also contemplates that telco management service 3 may acquire the ability to directly receive EDI feeds from the telecommunications providers. The invention further contemplates that the telecommunications data received from the telecommunications provider may be required to be validated. Such received data may contain errors, either because of transmission error or because of incorrect data entry, and further data modification screens may be provided for both entering and maintaining the data and may be particularly useful for the entry of the client defined categories.

In another embodiment of a telecommunications usage analysis system, customers may query this data via the query interface provided by this invention. According to this embodiment the customer may specify categories or site services accounts and network assets. These categories are a way for the client to analyze their data to their own specification. For example, each site can be assigned a code that specifies a region (north, Midwest, etc.). Each site can also be assigned a code that specifies a type of site (sales office, service center, distribution center, etc.). This will enable the client to identify all of the services by region and/or office type. Accounts may be assigned a code that specifies the general ledger account that the cost should be posted into a business unit for which charge backs are applied. For the following example, ANI's could be assigned codes that specify how the line is used (fax, modem, voice, etc.). Another feature of this system is the ability to update the inventory from moves after changes processed in other databases.

In another embodiment of a telecommunications usage analysis system, customer data warehouse 5 may include historical data of telecommunications usage and cost data which may be accessed and manipulated to determine trends. Upon request from a customer, telecommunications data can be stored over long periods of time, segmented by week, month, year, or other accounting period, thereby allowing for the determination of typical usage. The usage information may include the amount of time that upon average over yearly, monthly, daily periods or per day that the customers' businesses utilize their telecommunications resources.

For example, a hospital may utilize a computer system of a telco management service to provide business entities with telecommunications usage and cost analysis. The hospital may want to determine its average telecommunications cost per patient over the course of a year and compare those average costs to those of others in its industry, its size, or its geographic area. By keeping historical data the customer can determine the cost per patient for a year and also compare those costs to other medical providers, or other businesses, and their cost per patient per year to determine whether the hospital's resource is being over/under utilized or utilized correctly. This type of telecommunications usage data is invaluable in light of the increasing importance of telecommunications usage in many organizations.

The data may be processed and presented in a tree structure view whose limbs can be specified by the customer. Such data may be password protected so that the users can only access the limbs of the tree that they have permission to see. The customer may choose to view usage data by site, account, and/or service, or alternatively the customer may specify viewing the accounts for each vendor, the services provided at each site for each account, and the network assets used for each service.

The sequence and hierarchy of the information and reports presented from the usage data may also be specified by the customer, either predefined or by allowing user defined reports. Standard reports may be created to include the following or user defined reports may take on various structures based on the numerous types of usage data and business resources data which may be accessed and/or manipulated by the customers. Some examples of standard reports are: inventory by location, which lists the network assets by service type for each site; supplier, which lists all network assets by account by site; and inventory by a client category, which lists network assets by service type by site.

Figure 3:
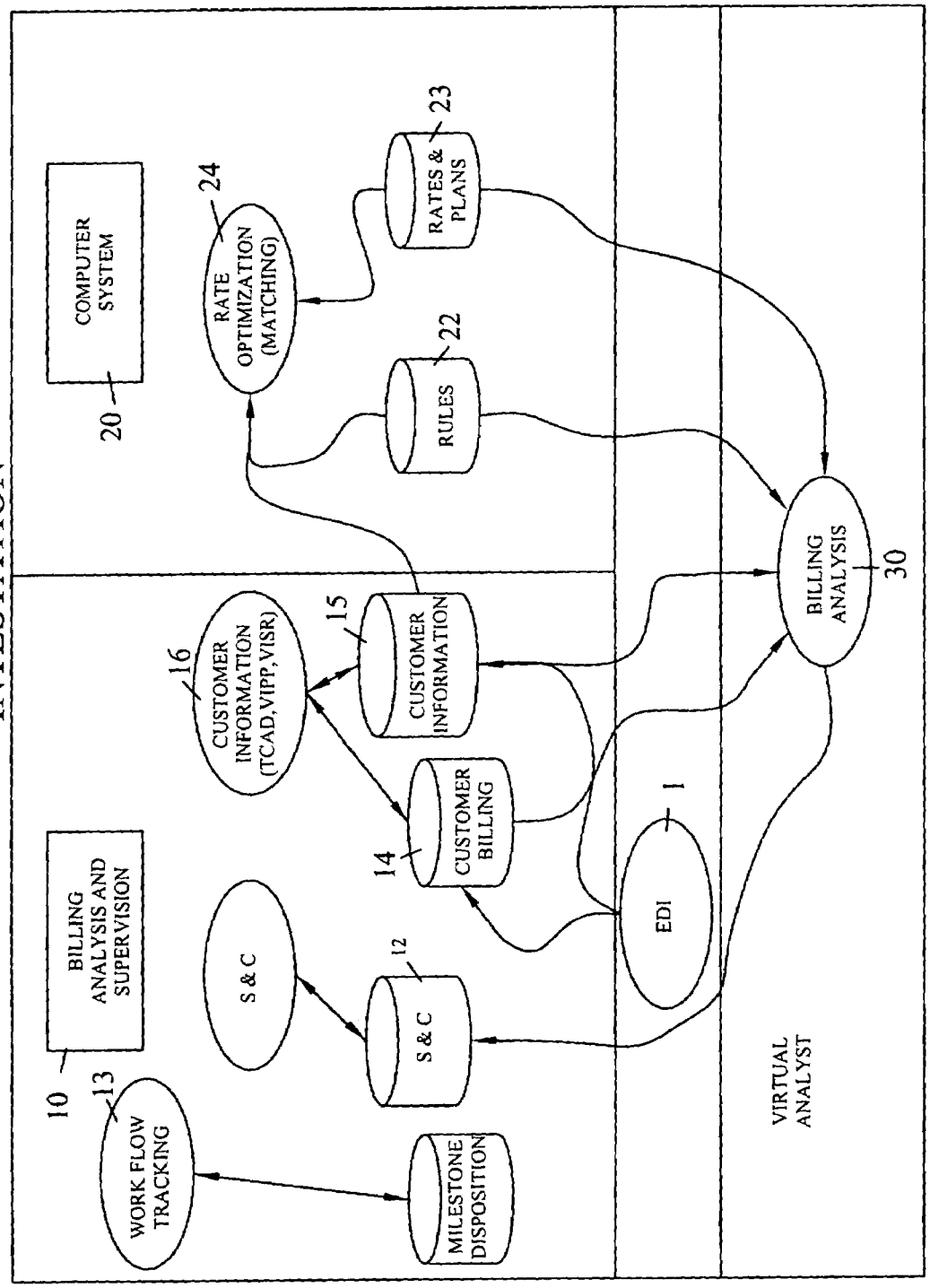
FIG. 3 is a schematic diagrammatic view of the relationships between subsystems of a telecommunications usage analysis system of the present invention.

Referring now to FIG. 3, two other aspects of a telecommunications usage analysis system are depicted, namely a telecommunication rate optimization system and a rate telecommunication billing verification system. With respect to the rate optimization system, calculation of telecommunication billing costs are based on telecommunication usage data and a plurality of rate plans. A computer with a processor and memory, which stores the telecommunications usage data and the rate plans, may run an optimizing module which selects the one of the rate plans which would result in the lowest cost. This optimizing module utilizes an inference engine and sets of rating rules for selecting the lowest cost rate plan based on the rating rules. This rate optimization computer system is depicted as computer system 20 and includes rate optimization 24, rules 22, and rates & plans 23. With this system, customer companies may minimize the cost of telecommunications services by identifying plans that provide the same combination of services at the lowest rates. This system may be utilized by very large, medium, and small companies and also may be used by consumers.

Rather than identify the lowest rate, the system of a telecommunications usage analysis system may alternatively be implemented to identify a number of alternatives and analyze how the cost of each will match the client's situation. For consumers and many small businesses, the match will be simple, i.e., one-for-one for the services (local, long distance, cellular, etc.) and the low-cost providers for each. For medium and large companies, the match is much more complex as the vendors base the rates for each service upon the total number of services required and commitments to volume (call, data, etc.) for the service.

Figure 4:
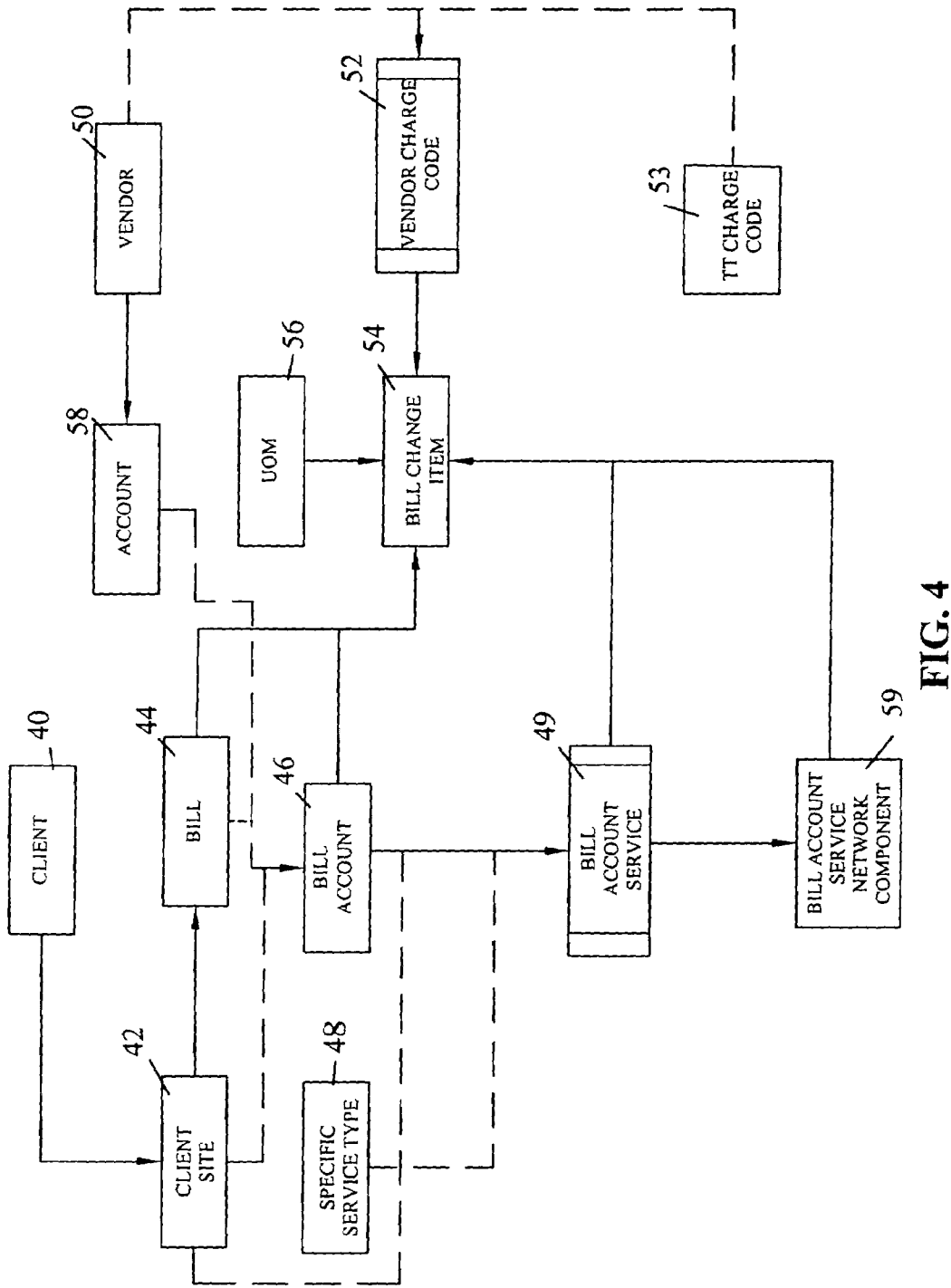
FIG. 4 is a relational diagram of the telecommunications cost analysis database of the present invention.
Figure 5:
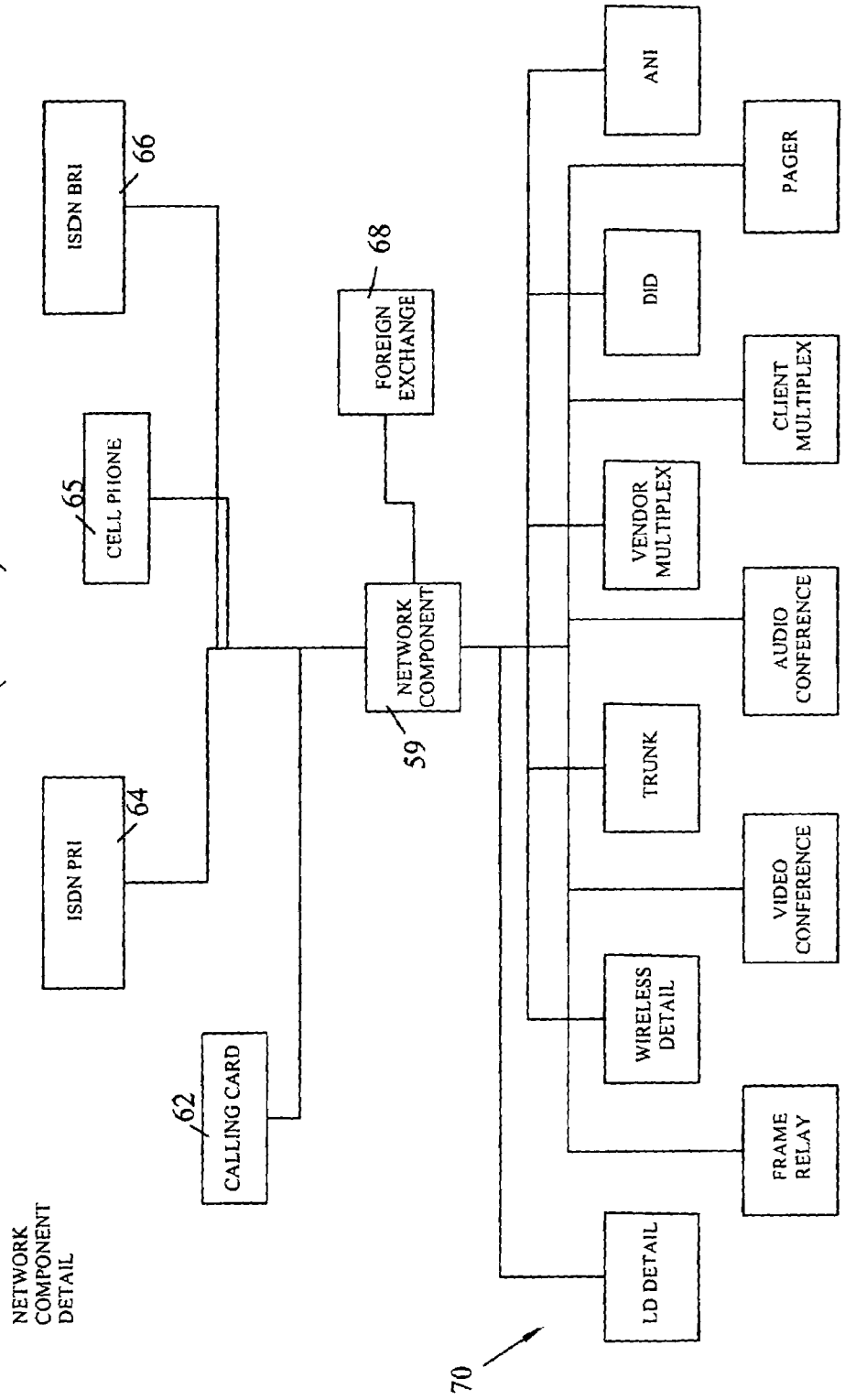
FIG. 5 is a relational diagram of the data components of an enterprise telecommunications system database.
Figure 6:
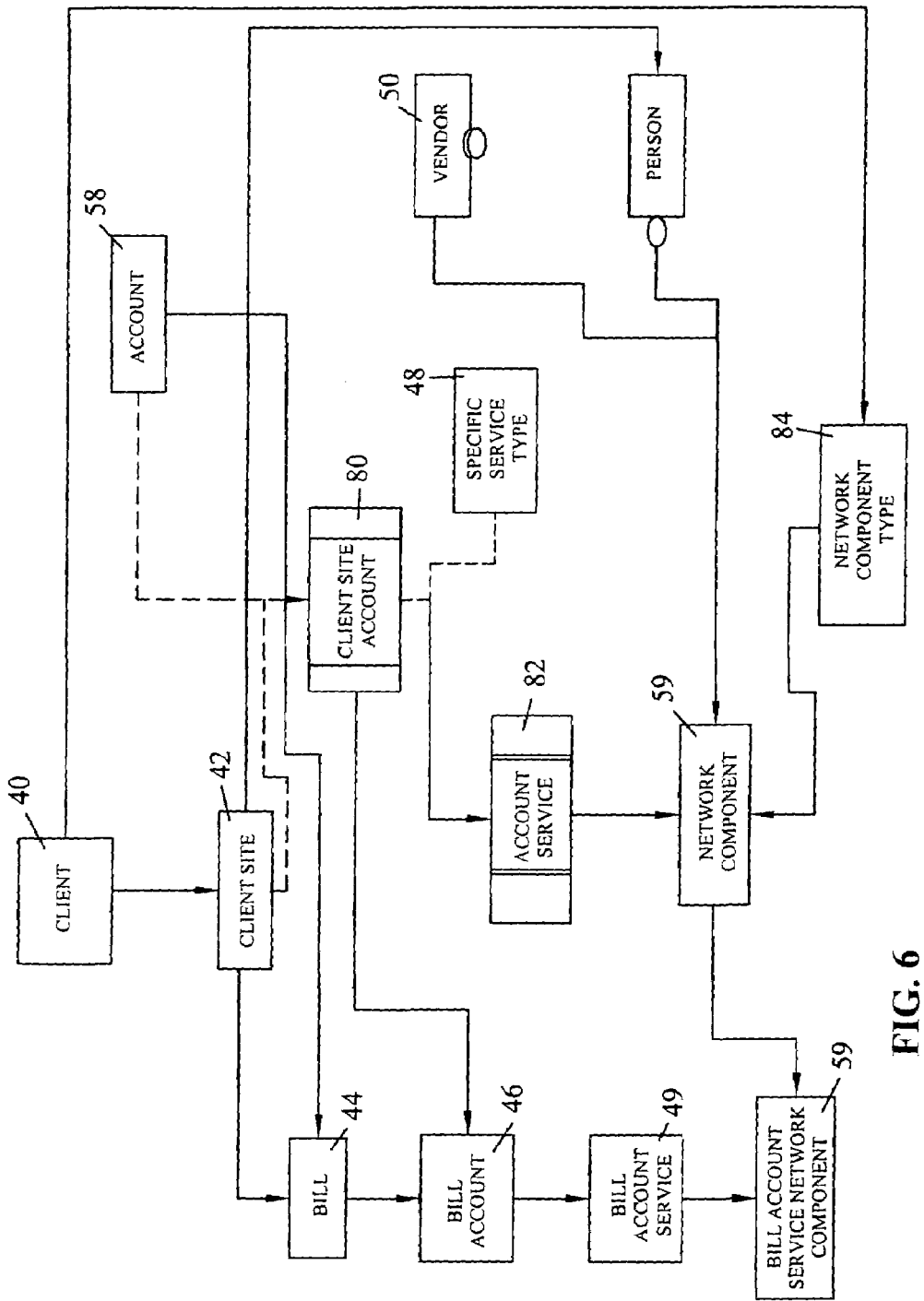
FIG. 6 is a relational diagram of the telecommunications cost analysis database relating to network costs of a telecommunications usage analysis system.
Figure 7:
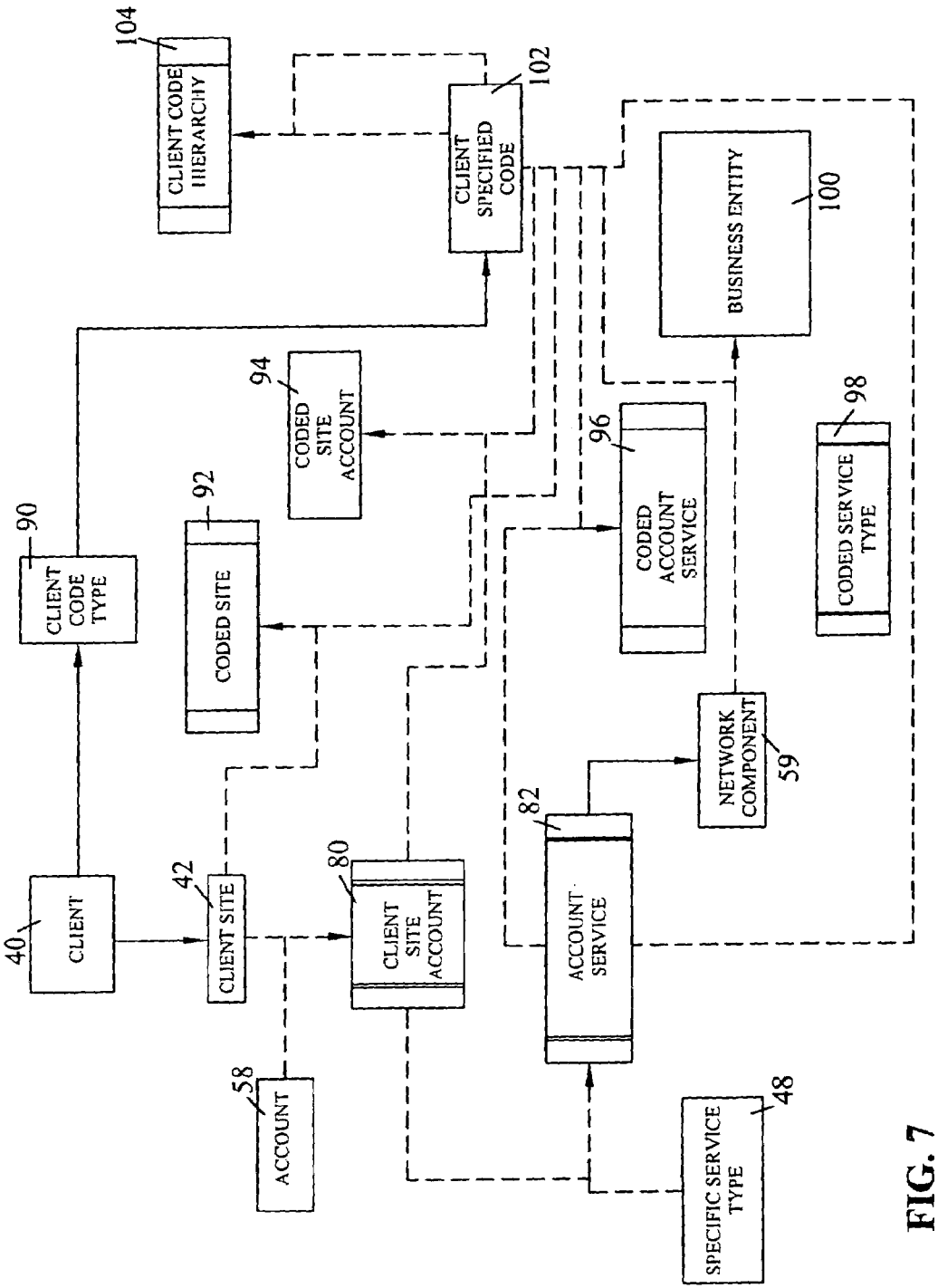
FIG. 7 is a relational diagram of the telecommunications cost analysis database relating to composite network costs of a telecommunications usage analysis system.

For these alternative implementations of a telecommunications usage analysis system, a rules based system may be used with the rules specified from knowledge gained by rate optimization analysts. For example, two sets of rules may be developed, one for building the client's telecommunication profile and the other for identifying the rates and plans. The telecommunication profile defines the current needs of the client as for telecommunications services, which may be based on the number of sites of the customer, the number of services, the volume of data, call patterns, and total cost. After the telecommunications profile is built, then the profile is matched against existing rate plans. The rules specify how to evaluate each rate plan to see if or how well it matches the customer's profile. All rate plans that match are displayed with expected costs. As depicted in FIG. 4, rate optimization 20 requires rates and plans database 23 that has the possible rates and plans, including rates and plans for all services (local, long distance, data, and wireless). Regulations require all telecommunications providers to publish all of their rates and plans including contracts for specific companies, which are typically large companies.

Referring again to FIG. 3, a telecommunications usage analysis system provides billing analysis and supervision 10 in the form of a computer system for verifying telecommunications billing costs based on telecommunications usage data and a contracted rate plan. This system may include a computer with a processor and a memory for storing the telecommunications usage data, contractor rate plans, and billing costs. The system may further include software capable of verifying the billing costs based on the telecommunications usage data, the billing cost, and the rate plan. As depicted in FIG. 3, the system includes customer billing 14, customer information database 15, customer information billing consolidation 16, savings and credit databases 12, and work flow tracking 13. The invoices for all sites the client receives are logged and tracked by the computer system of the present invention. A telecommunications usage analysis system identifies any missing invoices as well as any new invoices. A virtual invoice payment processing ("VIPP") may consolidate payment processing via bill consolidation 16 and likewise the visual invoice service reporting ("VISR") can consolidate invoice reporting via billing consolidation 16 and additionally telecommunication cost analysis database ("TCAD") may track and analyze the costs associated with a client's telecommunication usage. TCAD may build upon the data captured in the network inventory composite ("NIC") or in the translation software by requiring direct access to the monthly costs that are billed by the vendors for services they provide. Billing data is acquired and entered into TCAD, for example by use of network assets, including the due date, the billing date, the services billed and the accounts under which they are billed.

Charges that are associated with the bill are acquired and stored, including charges that are associated with account services within an account and/or network assets. Examples of charges that are associated with the bill include: total current charges, total federal tax, total state tax, total amount past due, total of the last bill, total payments made since the last bill, and total credits applied. Examples of the charges associated to a network asset include the call detail records for specific NIC. Charges are entered with a code provided by the vendor that identifies a type of charge. Each vendor defines their codes to identify the type of charge.

A translation table may be used to translate each vendor's code to a standard or universal code implemented in the system of the present invention. Once in place, customers are able to compare charges between vendors of telecommunication services. The telecommunications usage analysis system may also validate account services and network assets. If there are discrepancies in the billing data, such discrepancies are included and identified as a deviation from the known configurations so that an analyst is alerted to review the items and make the appropriate adjustments.

Charges from the vendor with a charge code not in the table will also be noted. A new charge code may be associated to an unknown standard or universal code and made available for an analyst to review and correct. Universal Service Ordering Codes ("USOC") may be used where applicable and available. The telecommunications usage analysis system may consolidate and aggregate data when monthly billing data is entered. The system may then create tables for consolidated and aggregated data for faster, easier reporting and analysis. Consolidated data is data that has been created from views that join multiple tables of which arithmetically combine several detail records into a smaller amount of data. In order to facilitate analysis and to improve performance, the system may be configured to automatically create consolidated tables for the most of the views. Aggregated data are cost totals for selected data sets, for example for specified time frames, for specified groups, and the users may specify from among the following or other parameters the data to aggregate: site, accounts, service, network asset types, user defined codes for each of the above, and charge codes.

Aggregation may be performed to create year-to-date totals by the parameter selected. The user may also specify time periods for aggregation, such as, the preceding three months for the same month for previous years, etc. These consolidated tables also make reporting and analysis easier while improving performance. The telecommunications usage analysis system may report data to customers in standard reports that show cost by site with vendor, service, charge code, etc. The system also may have several standard reports. Analyses include variances, trends, long hauls, etc. Reporting is done from consolidated data for performance optimization. Standard or user defined reports may include the following: service type by location (this report details the cost by service type for each site); supplier (this report details the cost by vendor by listing the cost by account by site for each vendor); the cost by site client category (this report lists the cost by service type for each site for client category); and cost by account client category (this report lists the cost by service type for each account for client category).

Another aspect of a telecommunications usage analysis system addresses errors which may be due to a myriad of problems including billing rate errors, charges for services that are not used, discounts unapplied, etc. Each record of telecommunications data is first examined by software to determine its type, and the record and a set of rules for the identified type are then sent to an inference engine. By applying the rules to the record, the inference engine identifies potential errors that provide opportunities for obtaining a refund or credit from the telecommunications provider. Such opportunities are identified and the associated charges are identified and quantified so that the records may be prepared and presented for review and approval of the vendor to obtain credit for the charges. This billing analysis function identifies potential billing recovery opportunities.

A telecommunications usage analysis system also allows for customer querying of its telecommunications usage data. A server may be deployed on a computer network, such as the Internet, that is connected to customer data warehouse 5 having the telecommunications usage data. The server may include a querying interface (for example using an HTML form, an application program interface ("API"), or a javascript interaction box) for enabling the searching and selecting data from customer data warehouse 5. The customer's browser, for example, may access the querying interface for requesting data according to a query instruction. The server operates as the query instruction specifies, performs the search, selection, or other processing of data, and presents the results of the processing to an end user or customer. This embodiment of a telecommunications usage analysis system allows users to quickly and easily display, manipulate, and analyze their telecommunications data. The query program of the computer system has predefined queries that may be selected to provide one of a wide variety of information and analyses. Such predefined queries may be used as templates for users to create their own queries. Users may also create new queries from scratch easily and quickly.

The query interface of a telecommunications usage analysis system may include a set or sets of search fields (such fields operating as limiters). These fields may represent components to be added to a "select" query that is built dynamically. The values of these fields dictate the content of the search return results. It may be possible to use as many or as few of these limiters as the customer wishes. This quantity will dictate the specificity of the results. The system provides for none selected, or all may be selected or any combination and quantity of the limiters may be selected. In defining the conditions of a limiter, a drop down box may be utilized, a text box, etc. The total number of limiters may be static or dynamic, and may also be activated by a simple press, submit could be utilized to run the query.

The return results dictated by the selected limiters will be displayed as fields that do not necessarily have to correlate one to one with the limiters selected. These predefined fields of data to return, none of which necessarily need to be limiters. Typically, the return fields structure is static, although the query software may be configured to allow user definition of the return fields. For example, functionality may be added to make available opportunity for a user to view specific details about a single record within the return data set by clicking on a dynamically built link in the output data. Users would then have an opportunity, before the canned query is executed, to further define their desired result.

The query results may be manipulated once the first results are returned. The user may sort the data in a graphical user interface by clicking on the column headers alpha and numeric and reverse alpha and reverse numeric. If the return results need to be further narrowed, the user can easily add another limiter and query again. If the return results need to be widened, the user can easily remove a limiter and query again. Limiter ranges can easily be refined and queries rerun. Calculations may also be specified to be performed on the return data (sums, averages, etc.). These may be dynamically adjusted based upon the return results.

Values added by customers define sets of limiters and a set of results that provide filters and data supplies useful information to the users. The telecommunications usage analysis system may create multiple limiter sets and returned structures to run against the same database. Provider software may be used to perform and analyze queries and results. The calculations and "total" fields can be built into the results that users can sort data and queries and be returned to examine trends. All that is required to access the query interface is a web browser.

The telecommunications usage analysis system, the data may also export its data. Such data may be exported to programs like Excel or other data manipulation system via ASCII file or other format downloaded to a user's computer (Excel is a product and trademark of MicroSoft Corporation). Calculated fields may also be returned to as numerical values but may cease to be dynamic once exported. Once in Excel or other format, graphs and charts can be generated by the users as required. Such data manipulation, such as by a formula or calculation, creating data having both original data and calculated data, or merged data. Merged data may be merged across databases using the same query. A predefined set of formulas may be utilized.

Throughout the disclosure of this invention the use of various databases have been discussed. There are two necessary components of the database utilized in this invention: the database management system ("DBMS") and the uniform database developed for use with the present invention. The DBMS involves a collection of programs that enables one to store, modify, and extract information from a database. The uniform database involves storing the data.

The two primary requirements of the DBMS selected are that it is ideally both commercially acceptable by the market and capable of storing, accessing, and manipulating extremely large volumes of data. A secondary requirement is the ability and desire of the DBMS provider to partner with the user of the present invention. There are three DBMS' that exemplify compatibility with these requirements: Oracle9*i* (Oracle9*i* is a product and trademark of Oracle Corporation), IBM's Database II Universal Database ("DB2 UDB") (DB, Universal Data Base, and IBM are trademarks of IBM Corporation), and Microsoft's Structured Query Language ("SQL").

Oracle9i runs on virtually every hardware and software platform. DB2 runs on IBM's mainframe 390 with UDB, an implementation of DB2 that will run across multiple platforms. SQL runs on Microsoft's NT platform. Oracle and DB2 UDB have been handling large volumes of data for a long time. SQL7.0 is the first version of Microsoft's DBMS that can support large data volumes, a desired feature for the present invention.

The uniform database format of the present invention may be provided by XML/XSL using active server pages ASP to get the data from the database and to transform the data into XML. Scripting languages may be used for client-side validation and arithmetic operations. At this point in time, XML is established as a common mainframe standard method of data interchange for many e-commerce and e-business applications. Of course, the uniform database format utilized can be any format that is capable of being interpreted by the interacting computer systems. EDI or Electronic Data Interchange is a protocol that enables companies to electronically pass data from one system to another system regardless of the platforms of either system, which is also compatible with the present invention.

Telecommunication providers generate massive amounts of that data that industries use. Only inventory and summary bill data could possibly be entered manually, and these require enormous amounts of manual labor. Telecommunication providers send their detail data to customers in one of three primary ways: paper, CD-ROM, or EDI; however, the only acceptable source of information by the telecommunications providers for obtaining cost credits is the original paper bill or the EDI form of the bill. The present invention includes the capability of utilizing three EDI transaction types: 811, 850 and 864 CSR (customer service record). EDI data contains inventory information about the ANI's and data services provided by a local provider and they are transmitted in "864" transactions. Monthly billing information is transmitted in 811 transactions, and MACs are transmitted in 850 transactions.

In an exemplary design, the present invention involves a method and computer system for obtaining telecommunications usage and/or cost data from either one or a plurality of telecommunications providers and aggregating the usage and/or cost data according to selected business entity aggregation criteria. A business entity may then evaluate its aggregated telecommunications usage and/or cost data in order to maximize the utilization of its telecommunications services.

Telecommunications usage data includes information associated with a business entity's use of a telecommunications provider's telecommunications resources, such as the duration of calls. There are many more parameters which define the telecommunications usage data that is obtained by the method and system of the present invention. A few of these parameters include, but are not limited to: the time of day the call was made, the geography specific to the call, the day the call was made, the day of the week or month the call was made, the seasonality of the call, the deviations and variance of the call, the service type offered, the vendor of the call, the identity of who made the call, the identity of who is being called, how often the call was made, where the call originated, where the call terminated, how often the call went unanswered (busy signals, abandoned, etc.), and any type of provided vendor analysis data.

Telecommunications cost data includes the costs associated with a business entity's use of a telecommunications provider's telecommunications resources. There are many parameters which may define telecommunications cost data that may be obtained by the method and system of the present invention. A few of these parameters include, but are not limited to: the use of network assets, the due date, the billing date, the service billed, the account under which the service is billed, the charges that are associated with account services within an account and/or network asset, total current charges, total federal tax, total state tax, total amount past due, total of the last bill, total payment made since the last bill, total credits applied, and the call detail records for specific NIC.

Telecommunications providers are companies in the telecommunications industry that provide a business entity with the use of their telecommunications equipment, including hardware and software for switching, routing, and handling the business entity's telephone calls. Such telecommunications providers may include national incumbent local exchange carriers (ILEC's), competitive local exchange carriers (LEC's), regional Bell operating companies (RBOC's), such as AT&T, MCI, WorldCom, Bell South, Verizon, Sprint, and Qwest—as well as interexchange carriers (IXC), regional and local telecommunications carriers.

The telecommunications providers also provide services to a business entity. These services include the provision of equipment, hardware, lines, and software for enabling, processing, and the storing of valuable information from calls that are switched, routed or handled by the business entity, all of which may be considered part of the business entity's telecommunications assets. A telecommunications provider may house a server that makes a record of calls made by a business entity which is utilizing the provider's switching, routing, and handling equipment. The telecommunications provider may then make available to a business entity data which includes telecommunications assets, usage and/or cost data.

The business entity aggregation criteria include criteria that determine which telecommunications asset, usage and/or cost data are aggregated. An aggregation of asset, usage and/or cost data according to selected criteria allows for the comparative evaluation of a particular field of a business entity's assets, usage and/or cost data. In the present invention, the telecommunications assets, usage and/or cost data may be aggregated according to the selected business entity aggregation criteria.

The business entity aggregation criteria includes usage aggregation criteria includes usage aggregation criteria, including location usage data. The parameters which define the location usage data may include site data and region data. A business entity may evaluate its telecommunications usage data according to its different sites. Alternatively, a business entity may compare its aggregated telecommunications usage data relating to the business entity's use of services in different regions, i.e. the Northwest region aggregated telecommunications usage data may be compared to that of the Northeast region. Such regions may simply refer to telephone area codes, or may be a business entity specified definition of region stored in a separate database, cross-referencing particular area codes or sub-area codes to user defined regions.

Usage aggregation criteria may also include service usage data. The parameters which define the service usage data include: service provider data, service type data, component data, and type of call data. A business entity may compare its aggregated telecommunications usage data relating to its use of different service providers, i.e. Qwest's aggregated telecommunications usage data may be compared to that of MCI's services. A business entity may also compare its aggregated telecommunications usage data relating to its use of different service types, i.e. switched-inbound lines data may be compared to that of switched-outbound lines.. A business entity may further compare its aggregated telecommunications usage data for different components, i.e. its use of telephone lines may be compared to its use of cell phones. A business entity may additionally compare its aggregated telecommunications usage data relating to different types of calls, i.e. its local calls may be compared to its long distance calls. Types of calls may also be defined by the business entity, for example, by the business entity specifying certain telephone numbers as customers, vendors, personal, or other classification type. This may be implemented by creating a separate database which associates telephone numbers with a classification type which can then be cross-referenced so that detail information about a call also has this business entity defined type of call information associated with the particular call, allowing for aggregation on that basis.

The usage aggregation criteria may also include time usage data. The parameters which define the time usage data include time of month data and length of call data. A business entity may compare its aggregated telecommunications usage data relating to different times of the month, i.e. its week one usage may be compared to its week four usage. A business entity may also compare its aggregated telecommunications usage data relating to different lengths of calls, i.e. its ten-minute calls may be compared to its twenty-minute calls.

Usage aggregation criteria may further include one or more items defined by the user, which may be combined with other redefined usage aggregation criteria. For example, the user may define a usage aggregation criteria as call purpose data, such as personal purpose data and business purpose. A business entity may then combine call purpose data, the user-defined criteria, with a predefined usage aggregation criteria such as time usage data. A business entity may then compare its aggregated telecommunications usage data relating to its calls that were made for personal purposes (i.e., user-defined call purpose data) and were ten-minutes in length (i.e., predefined time usage data) with its calls that were made for business purposes and were ten-minutes in length.

Business entity aggregation criteria may also include cost aggregation criteria, such as location cost data. The parameters which define the location cost data include, but are not limited to, site data and region data. A business entity may compare its aggregated telecommunications cost data relating to different locations or sites. A business entity may additionally compare its aggregated telecommunications cost data relating to its use in different regions, i.e. data from its Southeast region may be compared with that of its Midwest region. Such regions may simply refer to telephone area codes, or may be a business entity specified definition of region stored in a separate database, cross-referencing particular area codes or sub-area codes to user defined regions.

Cost aggregation criteria used to aggregate the telecommunications cost data may further include service cost data. The parameters which define the service cost data include, but are not limited to: service provider data, service type data, component data, and industry data. A business entity may compare its aggregated telecommunications cost data relating to its use of different service providers, i.e. AT&T's services may be compared to that of Sprint's services. A business entity may compare its aggregated telecommunications cost data relating to its use of different service types, i.e. dedicated-inbound lines. Telecommunications cost data may be compared to that of dedicated-outbound lines. A business entity may compare its aggregated telecommunications cost data relating to its use of different components, i.e. data circuits. Cost data may be compared to that of calling cards. A business entity may compare its aggregated telecommunications cost data relating to different industry sectors, i.e. the manufacturing industry. Cost data may be compared to that of the internet technology industry.

Cost aggregation criteria used to aggregate the telecommunications cost data may additionally include time cost data or type of call data. For example, a business entity may compare its aggregated telecommunications cost data relating to its week one usage to the business entity's aggregated telecommunications cost data relating to its week two usage. A business entity may additionally compare its aggregated telecommunications cost data relating to different types of calls, i.e. its customer calls may be compared to its vendor calls. Thus, types of calls may be defined by the business entity, for example, by the business entity specifying certain telephone numbers as customers, vendors, personal, or other classification type. This may be implemented by creating a separate database which associates telephone numbers with a classification type which can then be cross-referenced so that detail information about a call also has this business entity defined type of call information associated with the particular call, allowing for aggregation on that basis.

Cost aggregation criteria may also include one or more items defined by the user. Such user-defined criteria may be combined with other predefined cost aggregation criteria. For example, the user may define a cost aggregation criteria as call purpose data. The parameters which define the call purpose data may include personal purpose data and business purpose data. A business entity may then combine the call purpose data, the user-defined criteria, with a predefined cost aggregation criteria such as location cost data. Thus, a business entity may compare its aggregated telecommunications cost data relating to its calls that were made for personal purposes (i.e., user-defined call purpose data) in the Midwest region (i.e., predefined location cost data) with its calls that were made for business purposes in the Midwest region.

Aggregating data also involves the process of manipulating obtained data in order to produce and utilize a result. The invention's system and method consolidates the telecommunications usage data obtained from the telecommunications providers according to the usage aggregation criteria. For example, telco management service 107 of FIG. 1, when utilizing the present invention, may consolidate—by grouping together—all of the calls of business entity 100 that had a call duration (i.e., the telecommunications usage data) of ten minutes that were made using cell phones (i.e., the usage aggregation criteria). Business entity 100 may use this telecommunications usage data aggregation in order to better understand the amount of resources it is dedicating to ten-minute cell phone calls. The invention's system and method may also consolidate the telecommunications cost data obtained from the telecommunications providers according to the cost aggregation criteria. For example, telco management service 107 of FIG. 1, when utilizing the present invention, may consolidate—by grouping together—both all of the services used by business entity 100 that have current total charges (i.e., the telecommunications cost data) of more than $10,000 that were accumulated using landlines (i.e., the cost aggregation criteria) and all of the services used by business entity 100 that have current total charges of more than $10,000 that were accumulated by the use of data circuits. Business entity 100 may use these two telecommunications cost data aggregations in order to better understand the amount of charges it incurred over $10,000 by its use of landlines and data circuits.

Aggregating data may also involve the process of counting obtained data. For example, telco management service 107 of FIG. 1, when utilizing the present invention, may aggregate—by counting—all of the calls of business entity 100 that had a call duration (i.e., the telecommunications usage data) of at least ten minutes that were made using cell phones (i.e., the usage aggregation criteria). Business entity 100 may use this telecommunications usage data aggregation in order to determine the number of ten-minute calls it had made using cell phones. For another example, using cost aggregation criteria, telco management service 107 of FIG. 1, when utilizing the present invention, may aggregate—by counting—all of the services used by business entity 100 that have current total charges (i.e., the telecommunications cost data) of more than $10,000 that were accumulated using landlines (i.e., the cost aggregation criteria). Business entity 100 may use this telecommunications cost data aggregation in order to count its services that have total charges of over $10,000 that were accumulated using landlines.

Aggregating data may further involve the process of totaling obtained data according to the usage aggregation criteria. For example, telco management service 107 of FIG. 1, when utilizing the present invention, may aggregate—by totaling—both all of the calls of business entity 100 that had a call duration (i.e., the telecommunications usage data) of at least ten minutes that were made using cell phones (i.e., the usage aggregation criteria) and all of the calls of business entity 100 that had a call duration of at least five minutes that were made using cell phones. Business entity 100 may use these two telecommunications usage data aggregations in order to better determine whether it uses cell phones to make more five-minute or ten-minute calls.

Using cost aggregation criteria, telco management service 107 of FIG. 1, when utilizing the present invention may aggregate—by totaling—both all of the services used by business entity 100 that have current total charges (i.e., the telecommunications cost data) of more than $10,000 that were accumulated using landlines (i.e., the cost aggregation criteria) and all of the services used by business entity 100 that have current total charges of more than $10,000 that were accumulated by the use of data circuits. Business entity 100 may use these two telecommunications cost data aggregations in order to better understand whether it accumulates more charges over $10,000 by its use of landlines or data circuits.

Aggregating data may additionally involve the process of averaging obtained data according to the usage aggregation criteria. For example, telco management service 107 of FIG. 1, when utilizing the present invention, may aggregate—by averaging—both all of the calls of business entity 100 that had a call duration (i.e., the telecommunications usage data) of at least ten minutes that were made using cell phones (i.e., the usage aggregation criteria) and all of the calls of business entity 100 that had a call duration of at least ten minutes that were made using calling cards. Business entity 100 may use these two telecommunications usage data aggregations to compare or to determine the average number of ten-minute calls that it had made.

Using cost aggregation criteria, telco management service 107 of FIG. 1, when utilizing the present invention may aggregate—by averaging—both all of the services used by business entity 100 that have current total charges (i.e., the telecommunications cost data) of more than $10,000 that were accumulated using landlines (i.e., the cost aggregation criteria) and all of the services used by business entity 100 that have current total charges of more than $10,000 that were accumulated by the use of data circuits. Business entity 100 may use these two telecommunications cost data aggregations in order to determine the average number of total charges it has incurred over $10,000.

Aggregating data may involve still another process, that of calculating percentages based on the telecommunications usage data obtained from the telecommunications providers according to the usage aggregation criteria. For example, telco management service 107 of FIG. 1, when utilizing the present invention, may aggregate—by calculating percentages—both all of the calls of business entity 100 that had a call duration (i.e., the telecommunications usage data) of at least ten minutes that were made using cell phones (i.e., the usage aggregation criteria) and all of the calls of business entity 100 that had a call duration of at least five minutes that were made using cell phones. Business entity 100 may use these two telecommunications usage data aggregations in order to compare the percentage of ten-minute calls that were made using cell phones to the percentage of five-minute calls that were made using cell phones.

Aggregating data by calculating percentages according to the cost aggregation criteria may be exemplified by telco management service 107 of FIG. 1, when utilizing the present invention, may aggregate—by calculating percentages both all of the services used by business entity 100 that have current total charges (i.e., the telecommunications cost data) of more than $10,000 that were accumulated using landlines (i.e., the cost aggregation criteria) and all of the services used by business entity 100 that have current total charges of more than $10,000 that were accumulated by the use of data circuits. Business entity 100 may use these two telecommunications cost data aggregations in order to compare the percentage of total charges over $10,000 that were incurred using landlines to the percentage of total charges over $10,000 that were incurred using data circuits.

Aggregating data may also involve the process of calculating the standard deviation of obtained data according to the usage aggregation criteria. For example, telco management service 107 of FIG. 1, when utilizing the present invention, might choose to aggregate—by calculating standard deviations—both all of the calls of business entity 100 that had a call duration (i.e., the telecommunications usage data) of at least ten minutes that were made using cell phones (i.e., the usage aggregation criteria) and all of the calls of business entity 100 that had a call duration of at least ten minutes that were made using calling cards. Business entity 100 may use these two telecommunications usage data aggregations in order to calculate the standard deviation of the number of ten-minute calls it had made.

Using cost aggregation criteria, telco management service 107 of FIG. 1, when utilizing the present invention, may aggregate—by calculating standard deviations—both all of the services used by business entity 100 that have current total charges (i.e., the telecommunications cost data) of more than $10,000 that were accumulated using landlines (i.e., the cost aggregation criteria) and all of the services used by business entity 100 that have current total charges of more than $10,000 that were accumulated by the use of data circuits. Business entity 100 may use these two telecommunications cost data aggregations in order to calculate the standard deviation between the landline charges exceeding $10,000 and the data circuit charges exceeding $10,000.

Additionally, telco management service 107 may provide business entity 100 with the aggregated telecommunications data in an automated fashion. Automation is the use of computer hardware and software to carry out a step(s) of a process or method without human involvement. For example, a word processing system automates the process of numbering pages in a document. Instead of a user having to go to every page of a document and inserting a page number, word processing software is often designed to go through the document and automatically insert page numbers to each page. Referring to FIGS. 1 & 2, the flow of data from telecommunications providers 1, 101 to database 5, 106 may be configured to occur by preprogrammed processes. As telecommunications usage and cost data is processed by the telecommunications providers, that data may be initially copied to a uniform format at the provider or converted from provider formatted data to the uniform format at management service 3, 107.

In the present invention, after business entity 100 of FIG. 1 accesses the query interface of server 103 and selects a query, no further humor labor is required by either business entity 100 or telco management service 107. The system of the present invention accepts the query selected by business entity 100, queries the database, returns a query result, and presents the query result to the business entity 100. Similarly, telco management service 107 might use network interface 109 to access the query interface of server 103 and then select a query. Once the query is selected, no further humor labor is required by either telco management service 107 or business entity 100. The system of the present invention accepts the query selected by telco management service 107, queries the database, returns a query result, and presents the query result to telco management service 107. The system of the present invention delivers the query result over network 105 to business entity 100.

Performance data may additionally be associated with the aggregated telecommunications usage and/or cost data for analysis purposes. In one form, performance data may include sales success data, sales volume data, and sales type data. In another form, performance data may include bonus sales data, sales leads generation data, or other relevant business information.

Performance data may also be combined with the aggregated telecommunications usage and/or cost data. For example, referring to FIG. 1, business entity's 100 performance data may be accessed by telco management service 107 via network interface 108 and transferred electronically by way of network 105. Telco management service 107 associates the performance data with the aggregated telecommunications usage and/or cost data and either combines it with the aggregated telecommunications usage and/or cost data to be stored in database 106 or stores it in a separate file that can be cross-referenced. For example, every call detail record could have a business/personal purpose field added to the other call detail field so that the uniform format has a purpose field with at least three possible values: business, personal, or null (no value). Alternatively, a separate file could be used, with the separate file having a key field from the call detail record and then one or more further performance fields which may be associated via the key field with a corresponding call detail record. An additional structure for storing performance data may involve a variable number of performance fields associated with call detail record, using a separate file having: a key field (for associating with a call detail record); a performance indicator field (for indicating the type of performance data); and a value field (for storing the actual performance data). These examples are exemplary and not exhaustive of the plurality of data storage structures which are capable of performing the function of associating performance data with call detail information.

Telco management service 107 then makes the associated data accessible to business entity 100 via a query of either database 106 or the separate file. Specifically, telco management service 107 utilizing the present invention may associate both business entity's 100 successful sales (i.e., performance data) with its use of network assets (i.e., the telecommunications cost data) in the Midwest region (i.e., cost aggregation criteria) and business entity's 100 successful sales with its use of network assets in the Northeast region. Business entity 100 may access both data associations and analyze how its successful sales in the Midwest compare to its successful sales in the Northeast. If business entity's 100 successful sales in the Northeast are significantly more than its successful sales in the Midwest, this may indicate that business entity 100 needs to increase its use of telecommunications network assets in the Midwest region. Business entity 100 may alternatively transfer its performance data to telco management service 107 by non-electronic means such as standard mail or courier service.

Business entity 100 may further provide its performance data in electronic form to telco management service 107. Such forms may include EDI, XML, or other database file methods. Business entity 100 may also provide performance data to telecommunications providers 101, which may send such performance data with the telecommunications usage and/or cost data to telco management service 107, possibly using a user-defined field. In this way, the performance data may be stored in database 106 with the telecommunications usage and/or cost data.

Aggregated telecommunications usage and/or cost data may also be analyzed to generate metric data. Analyzing aggregated telecommunications usage and/or cost data may include averaging the aggregated telecommunications usage and/or cost data according to other information relating to the underlying usage and/or cost. This analysis generates metric data. The other information used in this analysis to generate metric data may be included in information provided by telecommunications providers 101 such as telephone lines, information associated with business entity 100 such as the number of FTEs, information provided by business entity 100 in the form of sales information, or information developed by telco management service 107 such as the number of production units. The parameters which define the metric usage data include, but are not limited to, the average telecommunications usage data per FTE, the average telecommunications usage data per telephone line, the average telecommunications usage data per sale, and the average telecommunications usage data per production unit. The parameters which define the metric cost data include, but are not limited to, the average telecommunications cost data per FTE, the average telecommunications cost data per telephone line, the average telecommunications cost data per sale, and the average telecommunications cost data per production unit.

For example, referring to FIG. 1, telecommunications provider 101 may provide telco management service 107 with information indicating that business entity 100 uses a number of telephone lines. Telco management service 107 analyzes the aggregated telecommunications usage and/or cost data and the information provided by telecommunications provider 101 to generate metric data. Telco management service 107 then either combines the metric data with the aggregated telecommunications usage and/or cost data to be stored in database 106 or stores the metric data in a separate file that can be cross-referenced. Telco management service 107 also makes the metric data accessible to business entity 100 via a query of either database 106 or the separate file. Specifically, telco management service 107 utilizing the present invention may analyze business entity's 100 use of telecommunications network assets (telecommunications cost data) in the Midwest region (cost aggregation criteria) according to the information provided by telecommunications provider 101. Telco management service 107 may then find the average use of network assets in the Midwest region per telephone line. As a result of this analysis, a metric data parameter (i.e., the average telecommunications cost data per telephone line) is generated.

In another example, telco management service 107 may analyze, according to information such as the number of business entity's 100 production units, business entity's 100 calls with a call duration (telecommunications usage data) of ten minutes that were made using cell phones (usage aggregation criteria). This production unit information may have been developed by telco management service 107. In any case, telco management service 107 may then find the average number of ten-minute calls that were made using cell phones per production unit. As a result of this analysis, a metric data parameter (i.e., the average telecommunications usage data per production unit) is generated.

In another example, telco management service 107 utilizing the present invention may analyze, according to FTE information associated with business entity 100, business entity's 100 total current charges (telecommunications cost data) relating to its use of Sprint's services (cost aggregation criteria). Telco management service 107 may then find the average number of total current charges relating to its use of Sprint's services per FTE. As a result of this analysis, a metric data parameter (i.e., the average telecommunications cost data per FTE) is generated.

In yet another example, telco management service 107 may analyze business entity's 100 calls made on Monday (telecommunications usage data) during the first week of a month (usage aggregation criteria) according to sales information provided by business entity 100. Telco management service 107 may then find the average number of calls made on Monday during the first week of the month per sale. As a result of this analysis, a metric data parameter (i.e., the average telecommunications usage data per sale) is generated.

Utilizing the present invention, the raw metric data generated by analyzing the aggregated telecommunications usage and/or cost data may be further analyzed by telco management service 107 in multiple ways. In one form, telco management service 107 may do a comparison analysis of the generated raw metric data. For example, telco management service 107 may compare business entity's 100 average use of network assets in the Midwest region per FTE to business entity's 100 average use of network assets in the Southeast region per FTE. In another example, telco management service 107 may compare business entity's 100 average number of ten-minute calls that were made using cell phones per production unit to business entity's 100 average number of ten-minute calls that were made using land lines per production unit.

Telco management service 107 may further use the raw metric data to do a pure trended data analysis on the aggregated telecommunications usage and/or cost data. For example, over a six-month period of time, telco management service 107 utilizing the present invention may analyze business entity's 100 use of telecommunications network assets (telecommunications cost data) in the Midwest region (cost aggregation criteria) according to business entity's 100 FTE information. Telco management service 107 may then find the average use of network assets in the Midwest region per FTE per six-month period. In another example, over a twelve-month period of time, telco management service 107 may analyze business entity's 100 calls with a call duration (telecommunications usage data) of ten minutes that were made using cell phones (usage aggregation criteria) according to business entity's 100 number of production units. Telco management service 107 may then find the average number of ten-minute calls that were made using cell phones per production unit per twelve-month period.

Telco management service 107 may additionally use the raw metric data to do a pure trended data comparison analysis on the aggregated telecommunications usage and/or cost data. For example, over both a six-month and twelve-month period of time, telco management service 107 may analyze business entity's 100 use of telecommunications network assets (telecommunications cost data) in the Midwest region (cost aggregation criteria) according to business entity's 100 FTE information. Telco management service 107 may then find the average use of telecommunications network assets in the Midwest region per FTE per six-month period and compare that use to the average use of telecommunications network assets in the Midwest region per FTE per twelve-month period. In another example, over both a twelve-month and a twenty-four-month period, telco management service 107 may analyze business entity's 100 calls with a call duration (telecommunications usage data) of ten minutes that were made using cell phones (usage aggregation criteria) according to business entity's 100 number of production units. Telco management service 107 may then find the average number of ten-minute calls that were made using cell phones per production unit per twelve-month period and compare it to the average number of ten-minute calls that were made using cell phones per production unit per twenty-four month period.

Business entity 100 may provide the metric information used to generate metric data in electronic form to telco management service 107. Such forms may include EDI, XML, or other database file methods. In still another form, business entity 100 may provide information used to generate metric data in paper or electronic form to telecommunications providers 101, which may send this information with the telecommunications usage and/or cost data to telco management service 107, possibly using a user-defined field. In this way, the other information may be stored in database 106 with the telecommunications usage and/or cost data.

FIG. 1 illustrates the hierarchical data flow of the present invention. In this embodiment, business entity 100 utilizes the telecommunications equipment, hardware, and software of one or more telecommunications providers 101. Records of all of business entity's 100 use of telecommunications provider's 101 services and the services' accompanying costs are kept by telecommunications providers 101 as telecommunications usage and/or cost data. Telecommunications usage and/or cost data are held by telecommunications provider 101 in format 102 determined by telecommunications provider 101. Formats 102 include, but are not limited to: paper, ASCII, CD-ROM, a Sterling or Van formatted database, HTML, or other known formats.

The telecommunications usage and/or cost data is translated from telecommunications provider format 102 to uniform format 104. The translation of the data into uniform format 104 may include the use of an XML type format. XML allows designers to create their own customized commands and then insert them into a document to specify how that document should be formatted. This feature enables the seamless definition, transmission, validation, and interpretation of data between applications. In this way, XML-formatted data readily allows for standard database search, access, and query functions and additionally has the property of being easily transferred over a computer network, e.g., a TCP/IP or ATM protocol network. However, if telecommunications usage and/or cost data are held by a business entity in a form such as paper that can not be transferred electronically, the method and system of the present invention provides for telco management service 107 to obtain the usage and/or cost data in its non-electronic form and then convert the usage and/or cost data into universal database format 104, for example, by scanning with an optical character reader (OCR) and formatting. Alternatively, business entity 100 may convert the telecommunications usage and/or cost data into uniform format 104 before the usage and/or cost data is obtained by telco management service 107. The invention also contemplates that telco management service 107 may acquire the ability to directly receive EDI feeds from the telecommunications providers 101.

In the present invention, as seen in FIG. 1, telco management service 107 obtains the telecommunications usage and/or cost data in uniform format 104. Server 103 hosted by telco management service 107 comprises software enabling telco management service 107 to aggregate the telecommunications usage and/or cost data according to either the usage and/or cost aggregation criteria.

In order for business entity 100 to analyze its telecommunications usage and/or cost data, the data must be aggregated. Before telco management service 107 aggregates the telecommunications usage data and/or cost data, however, business entity 100 selects the usage and/or cost aggregation criteria according to which the usage and/or cost data are to be aggregated. In one form, all of the usage and/or cost aggregation criteria may be selected and the telecommunications usage and/or cost data may be aggregated according to all of the usage and/or cost aggregation criteria. In another form, any combinations of the usage and/or cost aggregation criteria may be selected and the telecommunications usage and/or cost data is aggregated accordingly. Once the telecommunications usage and/or cost data are aggregated, the aggregated data is stored in database 106 hosted by telco management service 107. Database 106 may also be hosted by business entity 100.

The system of the invention also provides business entity 100 with the aggregated telecommunications usage and/or cost data. This may be achieved in two ways. In one form, database 106 which stores the aggregated telecommunications usage and/or cost data may be accessed by business entity 100 over network 105 via network interface 108. This may be accomplished by telco management service's 107 provision of a network portal which allows business entity 100 to query database 106 in which the aggregated usage and/or cost data is stored. Server 103 may be deployed on network 105, such as the Internet, that is connected to database 106. Server 103 may include a querying interface (for example using an HTML form, an API, or a javascript interaction box) for enabling the searching and selecting of data from database 106.

Figure 8:
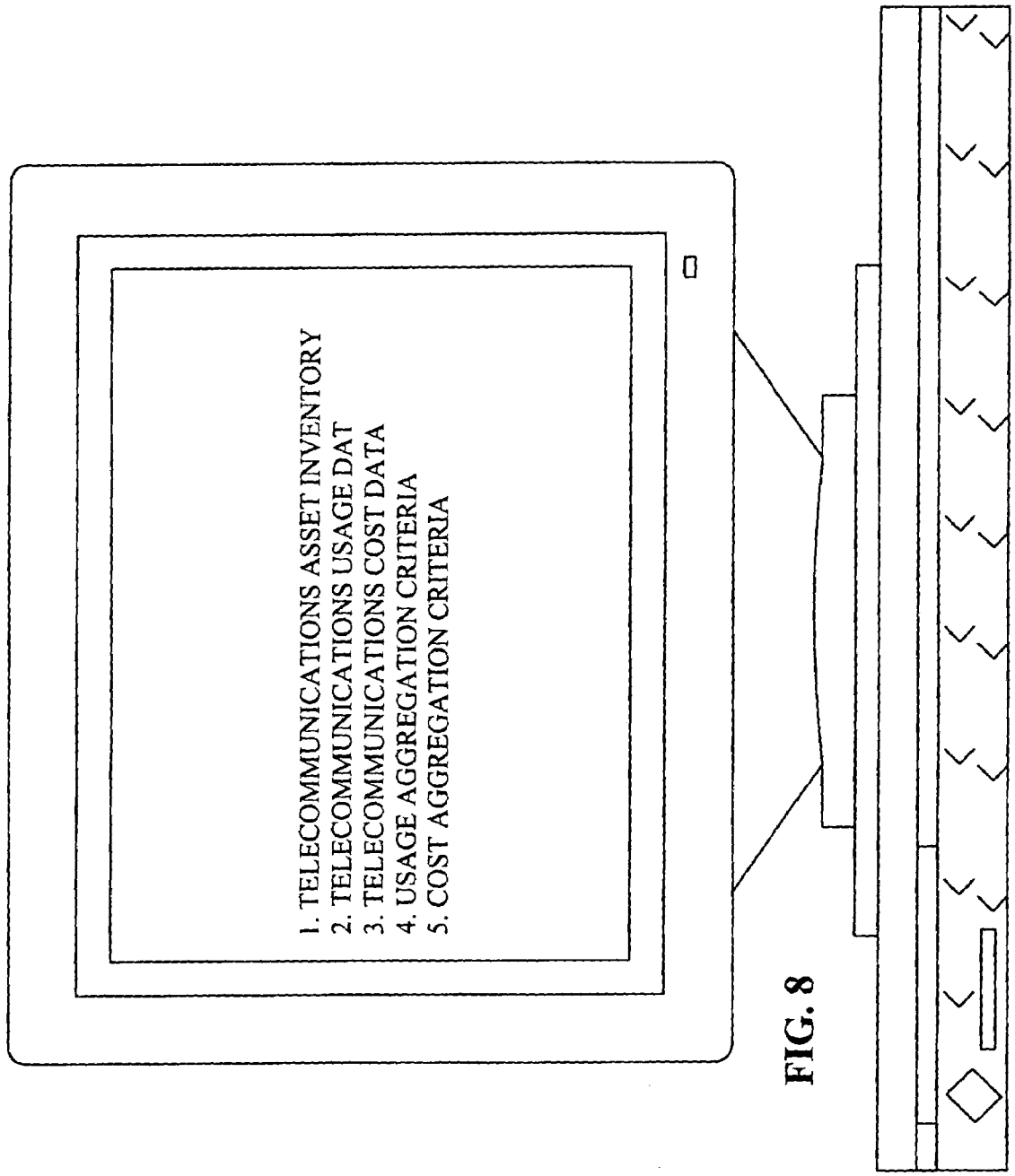
FIG. 8 is a view of a web browser used to access a menu based querying interface used to access the telecommunications usage analysis system of the present invention.
Figure 9:
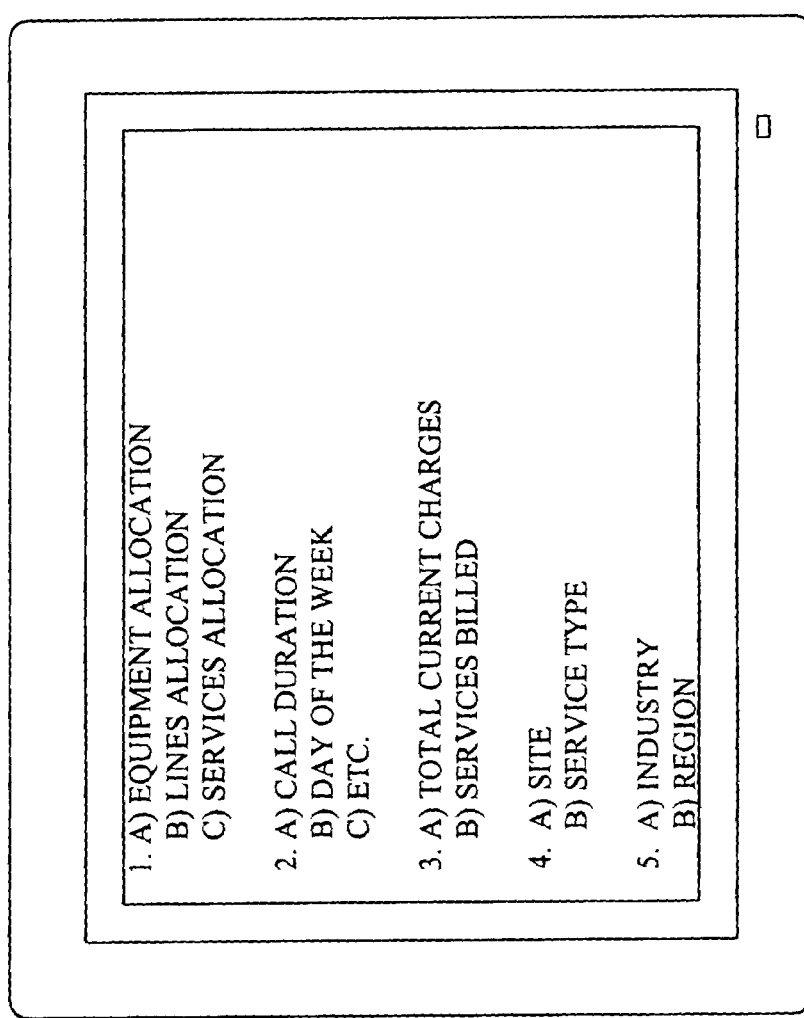
FIG. 9 is a view of a web browser used to access the menu based querying interface of the present invention.
Figure 9:
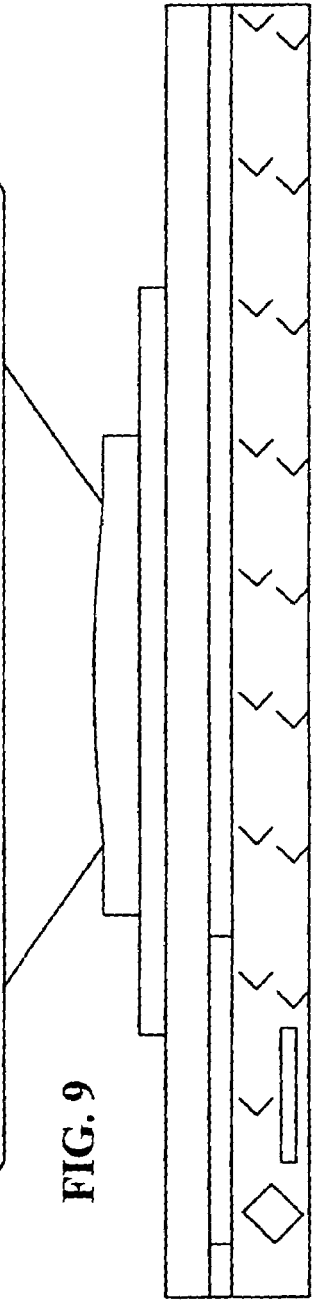
Figure 10:
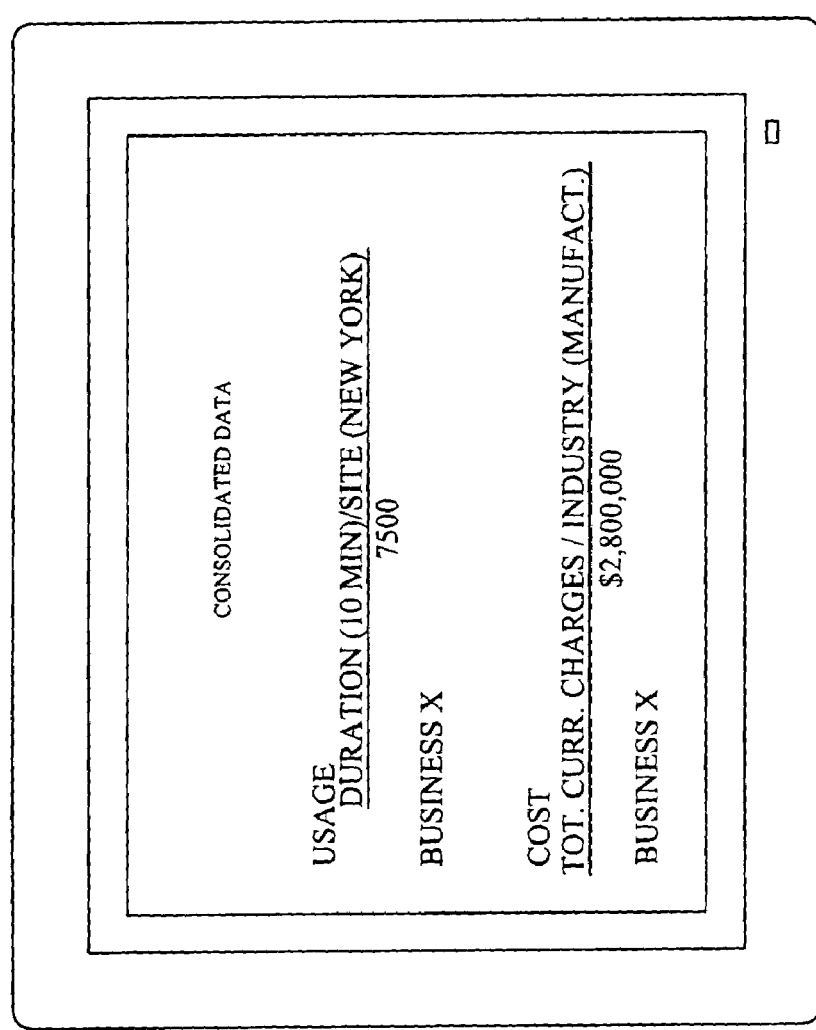
FIG. 10 is a view of a web browser used to access the results returned from a query of a database utilized in the present invention.

For example, referring to FIG. 1, business entity's 100 network interface 108 may access the querying interface for requesting data according to a query instruction. As FIG. 8 illustrates, the querying interface may be designed in the form of a menu. FIG. 9 displays the options a user may get upon selecting any of the choices displayed in FIG. 8. If a user selects choices (2)(*a*), (3)(*a*), (4)(*a*), and (5)(*a*), server 103 of FIG. 1 would operate to retrieve the requested telecommunications usage and/or cost data from database 106, return the usage and/or cost data, and present the querying results to business entity 100 in a form similar to that illustrated in FIG. 10. This embodiment of the present invention allows users to quickly and easily display, manipulate, and analyze both their telecommunications assets, usage and/or cost data.

The query program of the computer system may have predefined queries that may be selected to provide one of a wide variety of information and analyses. Such predefined queries may be used as templates for users to create their own queries. For example, the single-word topic services might stand for the predefined query that includes not only services, but also the related concepts local, long distance, and wireless. In this case, the following query finds pages that contain not only services, but also local, long distance, or wireless. Users may also easily and quickly create new queries from scratch. In one form, business entity's 100 accessing of the aggregated telecommunications usage and/or cost data over network 105 via network interface 108 may be automated.

In another form, database 106 which stores the aggregated telecommunications usage and/or cost data is queried by telco management service 107 and then delivered to business entity 100 over network 105. For example, referring to FIG. 1, server 103 may be deployed on network 105, such as the Internet, that is connected to database 106 storing the telecommunications usage and/or cost data. Server 103 may include a querying interface (for example using an HTML form, an API, or a javascript interaction box) for enabling the searching and selecting of data from database 106. Telco management service's 107 network interface 109 may access the querying interface for requesting data according to a query instruction. Telco management service 107 may then transmit the querying results to business entity 100 over network 105. In one form, the delivery of the aggregated telecommunications usage and/or cost data from telco management service 107 to business entity 100 over network 105 may be automated.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method for analyzing telecommunications data relating to a business entity, using business entity aggregation criteria, comprising the steps of:

(a) obtaining telecommunications provider invoices from a plurality of telecommunications providers that include telecommunications data relating to the business entity;

(b) aggregating the telecommunications data from the telecommunication provider invoices of the plurality of telecommunications providers according to business entity aggregation criteria to create an aggregated bill for the business entity;

(c) separating at least a portion of the aggregated bill into service categories;

(d) storing in a database, locations or sites of a customer's telecommunication services, services provided by site, a list of providers of each service, and accounts used for each billing service;

(e) providing a translation table to translate each telecommunications provider codes for its telecommunications data to a standard code implemented for use in the database;

(f) checking for errors in the telecommunication provider invoices and discrepancies between the billing data and the translation data;

(g) providing forecast from the telecommunication provider invoices and combinations of consolidated telecommunication data; and (h) including a data querying application accessible to the business entity that is capable of performing the search, selecting the desired data, or other processing of the data.

2. The method of claim 1, wherein the telecommunications data includes usage data.

3. The method of claim 1, wherein the telecommunications data includes cost data.

4. The method of claim 1, wherein the business entity aggregation criteria includes usage aggregation criteria.

5. The method of claim 4, wherein the usage aggregation criteria includes location usage data.

6. The method of claim 4, wherein the usage aggregation criteria includes service usage data.

7. The method of claim 4, wherein the usage aggregation criteria includes time usage data.

8. The method of claim 4, wherein the usage aggregation criteria includes user-defined usage data.

9. The method of claim 1, wherein the business entity aggregation criteria includes cost aggregation criteria.

10. The method of claim 9, wherein the cost aggregation criteria includes location cost data.

11. The method of claim 9, wherein the cost aggregation criteria includes service cost data.

12. The method of claim 9, wherein the cost aggregation criteria includes time cost data.

13. The method of claim 9, wherein the cost aggregation criteria includes user defined cost data.

14. The method of claim 1, wherein step (a) involves translating the telecommunications data to a uniform database format through the use of a translation table.

15. The method of claim 1, further comprising the step of selecting at least one business entity aggregation criteria prior to step (b).

16. The method of claim 15, wherein the selecting step involves selecting all of the business entity aggregation criteria.

17. The method of claim 15, wherein the selecting step involves selecting a combination of the business entity aggregation criteria.

18. The method of claim 1 further comprising the step of storing the aggregated telecommunications data into a database relating to the business entity.

19. The method of claim 1, further comprising the step of providing the business entity with the aggregated telecommunications data which involves accessing the aggregated telecommunications data over a network via a network interface.

20. The method of claim 1, further comprising the step of providing the business entity with the aggregated telecommunications data which involves delivering the aggregated telecommunications data over a network to the business entity.

21. The method of claim 1, further comprising the step of providing the business entity with the aggregated telecommunications data by automation.

22. The method of claim 1, further comprising the step of providing the business entity with the aggregated telecommunications data which involves providing a user query of the aggregated telecommunications data.

23. The method of claim 1 further comprising the step of associating performance data with the aggregated telecommunications data.

24. The method of claim 23, wherein the associating step involves:
    combining the performance data with the aggregated telecommunications data; and
    storing combined performance and aggregated telecommunications data into a database on a separate business entity server.

25. The method of claim 24 further comprising the step of accessing the combined performance and telecommunications data over a network via a network interface.

26. The method of claim 24 further comprising the step of providing a user query of the combined performance and aggregated telecommunications data in the database.

27. The method of claim 23, wherein the associating step involves storing the performance data into a file on a separate business entity server.

28. The method of claim 27 further comprising the step of providing a user query of the performance data in the file.

29. The method of claim 23 further comprising the step of accessing the performance data over a network via a network interface.

30. The method of claim 23, wherein the performance data includes at least one of sales success data, sales volume data, sales type data, bonus sales made data, and sales leads generation data.

31. A method for analyzing telecommunications data from a plurality of telecommunications providers relating to a business entity, using business entity aggregation criteria, comprising:

(a) means for obtaining telecommunications data from telecommunication provider invoices relating to the business entity;

(b) means for aggregating the telecommunications data from the telecommunication provider invoices of the telecommunications providers according to business entity aggregation criteria to create an aggregated bill for the business entity;

(c) means for separating at least a portion of the aggregated bill into service categories; and (d) database means for storing locations or sites of a customer's telecommunication services, services provided by site, a list of providers of each service, and accounts used for each billing service;

(e) translation table means for translating each telecommunications provider codes for its telecommunications data to a standard code implemented for use in the database means;

(f) means for checking for errors in the telecommunication provider invoices; and (g) means for providing forecast from the telecommunication provider invoices.

(h) means for checking for errors in the telecommunication provider invoices and discrepancies between the billing data and the translation table data;

(i) means for providing forecasts from the telecommunication provider invoices and combinations of consolidated telecommunication data; and, (j) means for performing a data querying application accessible to the business entity that is capable of performing the search, selecting the desired data, or other processing of the data.

32. The computer system of claim 31 further comprising means for providing the business entity with the aggregated telecommunications data.

33. The computer system of claim 32, wherein the telecommunications data includes usage data.

34. The computer system of claim 32, wherein the telecommunications data includes cost data.

35. The computer system of claim 32, wherein said means for obtaining includes means for translating the telecommunications data to a uniform database format.

36. The computer system of claim 31, wherein the business entity aggregation criteria includes usage aggregation criteria.

37. The computer system of claim 36, wherein the usage aggregation criteria includes location usage data.

38. The computer system of claim 36, wherein the usage aggregation criteria includes service usage data.

39. The computer system of claim 36, wherein the usage aggregation criteria includes time usage data.

40. The computer system of claim 36, wherein the usage aggregation criteria includes user-defined usage data.

41. The computer system of claim 31, wherein the business entity aggregation criteria includes cost aggregation criteria.

42. The computer system of claim 41, wherein the cost aggregation criteria includes location cost data.

43. The computer system of claim 42, wherein the cost aggregation criteria includes service cost data.

44. The computer system of claim 42, wherein the cost aggregation criteria includes time cost data.

45. The computer system of claim 42, wherein the cost aggregation criteria includes user-defined cost data.

46. The computer system of claim 31, further comprising means for selecting at least one business entity aggregation criteria prior to the aggregating means.

47. The computer system of claim 46, wherein the means for selecting includes means for selecting all of the business entity aggregation criteria.

48. The computer system of claim 46, wherein said means for selecting includes means for selecting a combination of the business entity aggregation criteria.

49. The computer system of claim 31 further comprising means for storing the aggregated telecommunications data into a database relating to the business entity.

50. The computer system of claim 31, wherein said means for providing includes means for accessing the aggregated telecommunications data over a network via a network interface.

51. The computer system of claim 31, wherein said means for providing includes means for delivering the aggregated telecommunications data over a network to the business entity.

52. The computer system of claim 31, wherein said means for providing is automated.

53. The computer system of claim 31, wherein said means for providing includes means for providing a user query of the aggregated telecommunications data located on a separate business entity server.

54. The computer system of claim 31 further comprising means for associating performance data with the aggregated telecommunications data.

55. The computer system of claim 54, wherein said means for associating includes:
means for combining the performance data with the aggregated telecommunications data; and
means for storing combined performance and aggregated telecommunications data into a database on a separate business entity server.

56. The computer system of claim 55, wherein said means for associating includes means for storing the performance data into a file.

57. The computer system of claim 56 further comprising means for providing a user query of the performance data in said file.

58. The computer system of claim 55 further comprising means for accessing the combined performance and telecommunications data over a network via a network interface.

59. The computer system of claim 55 further comprising means for providing a user query of the combined performance and aggregated telecommunications data in the database.

60. The computer system of claim 54 further comprising means for accessing the performance data over a network via a network interface.

61. The computer system of claim 54, wherein said performance data includes at least one of sales success data, sales volume data, sales type data, bonus sales made data, and sales leads generation data.

62. A machine-readable program storage device for storing encoded instructions for a method of analyzing telecommunications data relating to a business entity, using business entity aggregation criteria, said method comprising the steps of (a) obtaining, telecommunications provider invoices from a plurality of telecommunications providers that include telecommunications data relating to the business entity;

(b) aggregating the telecommunications data from the telecommunications providers according to business entity aggregation criteria to create an aggregated bill for the business entity;

(c) separating at least a portion of the aggregated bill into service categories;

(d) storing in a database, locations or sites of a customer's telecommunication services, services provided by site, a list of providers of each service, and accounts used for each billing service;

(e) providing a translation table to translate each telecommunications provider codes for its telecommunications data to a standard code implemented for use in the database;

(f) checking for errors in the telecommunication provider invoices; and (g) providing forecast from the telecommunication provider invoices.

(h) checking for errors in the telecommunication provider invoices and discrepancies between the billing data and the translation table data;

(i) providing forecasts from the telecommunication provider invoices and combinations of consolidated telecommunication data; and, (j) including a data querying application accessible to the business entity that is capable of performing the search, selecting the desired data, or other processing of the data.

63. The machine-readable program storage device of claim 62, wherein the telecommunications data includes usage data.

64. The machine-readable program storage device of claim 62, wherein the telecommunications data includes cost data.

65. The machine-readable program storage device of claim 62, wherein the business entity aggregation criteria includes usage aggregation criteria.

66. The machine-readable program storage device of claim 65, wherein the usage aggregation criteria includes location usage data.

67. The machine-readable program storage device of claim 65, wherein the usage aggregation criteria includes service usage data.

68. The machine-readable program storage device of claim 65, wherein the usage aggregation criteria includes time usage data.

69. The machine-readable program storage device of claim 65, wherein the usage aggregation criteria includes user-defined usage data.

70. The machine-readable program storage device of claim 62, wherein the business entity aggregation criteria includes cost aggregation criteria.

71. The machine-readable program storage device of claim 70, wherein the cost aggregation criteria includes location cost data.

72. The machine-readable program storage device of claim 70, wherein the cost aggregation criteria includes service cost data.

73. The machine-readable program storage device of claim 70, wherein the cost aggregation criteria includes time cost data.

74. The machine-readable program storage device of claim 70, wherein the cost aggregation criteria includes user-defined cost data.

75. The machine-readable program storage device of claim 62, wherein step (a) of the method involves translating the telecommunications data to a uniform database format.

76. The machine-readable program storage device of claim 62 wherein the method further comprises the step of selecting at least one business entity aggregation criteria prior to step (b).

77. The machine-readable program storage device of claim 76, wherein the selecting step of the method involves selecting all of the business entity aggregation criteria.

78. The machine-readable program storage device of claim 76, wherein the selecting step of the method involves selecting a combination of the business entity aggregation criteria.

79. The machine-readable program storage device of claim 62, wherein the method further comprises the step of storing the aggregated telecommunications data into a database relating to the business entity.

80. The machine-readable program storage device of claim 62, wherein the method further comprises the step of providing the business entity with the aggregated telecommunications data which involves accessing the aggregated telecommunications data over a network via a network interface.

81. The machine-readable program storage device of claim 62, wherein the method further comprises the step of providing the business entity with the aggregated telecommunications data which involves delivering the aggregated telecommunications data over a network to the business entity.

82. The machine-readable program storage device of claim 62, wherein the method further comprises the step of providing the business entity with the aggregated telecommunications data by automation.

83. The machine-readable program storage device of claim 62, wherein the method further comprises the step of providing the business entity with the aggregated telecommunications data which includes providing a user query of the aggregated telecommunications data.

84. The machine-readable program storage device of claim 62 wherein the method further comprises the step of associating performance data with the aggregated telecommunications data.

85. The machine-readable program storage device of claim 84, wherein the associating step of the method includes:

combining the performance data with the aggregated telecommunications data;

storing combined performance and aggregated telecommunications data into a database to create an aggregated bill for the business entity; and (c) separating at least a portion of the aggregated bill into service categories.

86. The machine-readable program storage device of claim 85 wherein the method further comprises the step of accessing the combined performance and telecommunications data over a network via a network interface.

87. The machine-readable program storage device of claim 85 wherein the method further comprises the step of providing a user query of the combined performance and aggregated telecommunications data in the database.

88. The machine-readable program storage device of claim 84, wherein the associating step of the method includes storing the performance data into a file.

89. The machine-readable program storage device of claim 88 wherein the method further comprises the step of providing a user query of the performance data in the file.

90. The machine-readable program storage device of claim 84 wherein the method further comprises the step of accessing the performance data over a network via a network interface.

91. The machine-readable program storage device of claim 84, wherein the performance data includes at least one of sales success data, sales volume data, sales type data, bonus sales made data, and sales leads generation data.

* * * * *